(12) United States Patent
Matsumoto

(10) Patent No.: US 8,456,658 B2
(45) Date of Patent: Jun. 4, 2013

(54) IMAGE PROCESSING SYSTEM, IMAGE PROCESSING APPARATUS, METHOD FOR CONTROLLING DISPLAY OF FUNCTION SETTING SCREEN, AND RECORDING MEDIUM

(75) Inventor: Yukinori Matsumoto, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 160 days.

(21) Appl. No.: 13/189,630

(22) Filed: Jul. 25, 2011

(65) Prior Publication Data

US 2012/0026525 A1 Feb. 2, 2012

(30) Foreign Application Priority Data

Jul. 27, 2010 (JP) ................................. 2010-168702

(51) Int. Cl.
G06F 3/12 (2006.01)
G06K 15/00 (2006.01)
(52) U.S. Cl.
USPC ........ 358/1.13; 358/1.14; 358/1.17; 358/1.18
(58) Field of Classification Search
None
See application file for complete search history.

(56) References Cited

U.S. PATENT DOCUMENTS

| 5,956,029 A | 9/1999 | Okada et al. |
| 2004/0139402 A1* | 7/2004 | Azami .......................... 715/527 |
| 2005/0157321 A1* | 7/2005 | Alacar ......................... 358/1.13 |
| 2008/0068655 A1 | 3/2008 | Kimura |
| 2008/0098303 A1* | 4/2008 | Murayama .................... 715/274 |

FOREIGN PATENT DOCUMENTS

| JP | 10-083269 A | 3/1998 |
| JP | 2001-306204 | 11/2001 |
| JP | 2008-097574 | 4/2008 |

* cited by examiner

Primary Examiner — Twyler Haskins
Assistant Examiner — Henok Shiferaw
(74) Attorney, Agent, or Firm — Buchanan Ingersoll & Rooney PC

(57) ABSTRACT

An image processing system includes an information processing apparatus and one or a plurality of image processing apparatuses that can be connected to the information processing apparatus via a network. A function whose function set value is to be displayed on a function setting screen is identified from identifying information included in screen information made by the information processing apparatus. The image processing apparatus includes an identifying information storage part in which identifying information of a function is stored, and of the functions whose identifying information is stored, all function set values of the identified function are displayed on a display part in a mode that can be selected by a user.

31 Claims, 13 Drawing Sheets

FIG.4A
Image processing apparatus 2

| Category | Group | Function | Set value | ID |
|---|---|---|---|---|
| Scan | | | | 1000000 |
| | Reading setting | | | 1010000 |
| | | File Format | | 1010100 |
| | | | PDF | 1010101 |
| | | | CompactPDF | 1010102 |
| | | Resolution | | 1010200 |
| | | | 200dpi | 1010201 |
| | | | 300dpi | 1010202 |
| | | Double side | | 1010300 |
| | | | Double side | 1010301 |
| | | | Single side | 1010302 |
| | Image adjustment | | | 1020000 |
| | | Color | | 1020100 |
| | | | Full color | 1020101 |
| | | | Gray scale | 1020102 |
| | | Sharpness | | 1020200 |
| | | | −1 | 1020201 |
| | | | 0 | 1020202 |
| | | | 1 | 1020203 |

FIG.4B
Image processing apparatus 3

Added to image processing appratus 3

| Category | Group | Function | Set value | ID |
|---|---|---|---|---|
| Scan | | | | 1000000 |
| | Reading setting | | | 1010000 |
| | | File Format | | 1010100 |
| | | | PDF | 1010101 |
| | | | CompactPDF | 1010102 |
| | | | SearchablePDF | 1010103 |
| | | Resolution | | 1010200 |
| | | | 200dpi | 1010201 |
| | | | 300dpi | 1010202 |
| | | Double side | | 1010300 |
| | | | Double side | 1010301 |
| | | | Single side | 1010302 |
| | Image adjustment | | | 1020000 |
| | | Color | | 1020100 |
| | | | Full color | 1020101 |
| | | | Gray scale | 1020102 |
| | | Sharpness | | 1020200 |
| | | | −1 | 1020201 |
| | | | 0 | 1020202 |
| | | | 1 | 1020203 |
| | | Ground adjustment | | 1020300 |
| | | | Thin | 1020301 |
| | | | Normal | 1020302 |
| | | | Thick | 1020303 |

IMAGE PROCESSING SYSTEM, IMAGE PROCESSING APPARATUS, METHOD FOR CONTROLLING DISPLAY OF FUNCTION SETTING SCREEN, AND RECORDING MEDIUM

This application claims priority under 35 U.S.C. §119 to Japanese Patent Application No. 2010-168702 filed on Jul. 27, 2010, the entire disclosure of which is incorporated herein by reference in its entirety.

BACKGROUND OF THE INVENTION

1. Technical Field

This invention relates to: an image processing system including an information processing apparatus constructed of a personal computer and the like and one or a plurality of image processing apparatuses that can be connected to the information processing apparatus via a network; an image processing apparatus that can be suitably used for the system; a method that is performed by the system for controlling display of a function setting screen; and a recording medium having a program stored thereon to make a computer of the image processing apparatus perform a processing for controlling display of a function setting screen.

2. Description of the Related Art

The following description sets forth the inventor's knowledge of related art and problems therein and should not be construed as an admission of knowledge in the prior art.

In recent years, an image processing apparatus such as a multi-function digital image processing apparatus, which is referred to as Multi Function Peripherals (MFP) having a plurality of functions such as a copying function, a printing function, and a faxing function, has many functions provided therein. In the image processing apparatus like this, a function setting screen for setting these functions is displayed on a display part of an operation panel or the like and a function set value is inputted by using this function setting screen. There has been known a system for forming this function setting screen by application software (also simply referred to as "application") installed in an information processing apparatus such as a personal computer.

In this system, screen information for displaying a desired function setting screen is made by the information processing apparatus in response to a request from the image processing apparatus and is sent to the image processing apparatus, and the sent screen information is displayed on the display part of the image processing apparatus, and a user is made to set a function. When the steps of: acquiring the function setting screen from the information processing apparatus; displaying the function setting screen; and setting the function by the user are performed repeatedly as appropriate, the setting of the function is finished. In this way, the image processing apparatus can perform a job.

In this regard, as described above, in order to make the function setting screen of the image processing apparatus by the application of the information processing apparatus, the application of the information processing apparatus needs to recognize the functions provided in the image processing apparatus. However, in a case where a new function is provided in the image processing apparatus, or in a case where a new function set value is added to an already provided function, or in a case where an image processing apparatus having a new function is newly connected to the information processing apparatus, if the application remains unchanged, the application cannot make a function setting screen in which a function set value for using the new function and a newly added function set value are displayed.

Hence, in the background art, the application of the information processing apparatus is updated, whereby the new function of the image processing apparatus and the added function set value can be recognized and the function setting screen can be made.

Here, in Japanese Patent Application Laid-Open No. H10-83269 is provided a user interface converting apparatus that extracts only necessary information from essential screen information without changing an existing application program and without making all screen data again by a screen maker and that makes a conversion screen automatically.

Specifically, a screen information acquiring part acquires screen information of an application, and an attention point information extracting part indicates an attention point in this acquired screen information, and a conversion interface making part makes conversion screen information on the basis of this indicated attention point by the use of a conversion template, and a conversion interface control part provides an output device with the made conversion screen information, and a user operates a conversion screen via the conversion interface control part through an input device to thereby use the application.

However, the operation of updating the application is troublesome. In addition, under circumstances in which a plurality of image processing apparatuses are managed by one information processing apparatus, even in a case where a new function is provided in or a function set value is added to only one image processing apparatus, the application needs to be updated to reduce efficiency, or in a case where different new functions are provided in or different function set values are added to a plurality of image processing apparatuses, the application needs to be updated in each case. Thus, this presents a problem that the operation of updating the application becomes more complicated.

Further, there is presented another problem that an application needs to be modified so as to update the application.

In this regard, in the technology described in Japanese Patent Application Laid-Open No. H10-83269, only necessary information is extracted from the essential screen information and the conversion screen information is made by the use of the conversion template, so that a converted screen is limited. Therefore, in a case where an arbitrary new function and a function set value are added to the image processing apparatus, a function setting screen having a function set value related to the new function and the added function set value cannot be displayed.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

According to a first aspect of the present invention, an image processing system comprising:
an information processing apparatus; and
one or a plurality of image processing apparatuses that can be connected to the information processing apparatus via a network,
wherein the information processing apparatus includes:
an identifying information storage part for storing identifying information given in advance in such a way as to be common between the information processing apparatus and the respective image processing apparatuses in a mode in which, with respect to one or a plurality of functions provided in the image processing apparatus, a set value of the function, and a function group into which the functions are grouped, a corresponding relationship between the function group, the function, and the function set value is described;

a screen information making part for making screen information which includes identifying information of at least one of the function group, the function, and the function set value and which is used for displaying a function setting screen; and a sending part for sending the screen information made by the screen information making part to the image processing apparatus in response to an acquisition request from the image processing apparatus, and wherein the image processing apparatus includes:

a sending part for sending the acquisition request of the screen information to the information processing apparatus;

a receiving part for receiving the screen information sent from the information processing apparatus;

a display part;

an identifying information storage part for storing the identifying information related to a kind of the function provided in the apparatus, a set value of the function, and the function group and, in a case where a function and/or a function set value are/is newly added, for storing also identifying information of the added function and/or the added function set value;

an identifying part for identifying a function whose function set value is to be displayed on the function setting screen from among the identifying information included in the screen information received by the receiving part; and a display control part for displaying all function set values of the function identified by the identifying part of the functions whose identifying information are stored in the identifying information storage part of the apparatus on the display part in a mode that can be selected by a user.

According to a second aspect of the present invention, an image processing apparatus that can be connected to an information processing apparatus via a network, the image processing apparatus comprising:

an identifying information storage part for storing identifying information given in advance in common with the information processing apparatus in a mode in which, with respect to one or a plurality of functions provided in the image processing apparatus, a set value of the function, and a function group into which the functions are grouped, a corresponding relationship between the function group, the function, and the function set value is described, and in a case where a function and/or a function set value are/is newly added, for storing also identifying information of the added function and/or the added function set value;

a sending part for sending an acquisition request of screen information, which includes identifying information of at least one of the function group, the function, and the function set value and which is used for displaying a function setting screen, to the information processing apparatus;

a receiving part for receiving screen information sent from the information processing apparatus;

a display part;

an identifying part for identifying a function whose function set value is to be displayed on a function setting screen from among identifying information included in the screen information received by the receiving part; and a display control part for displaying all function set values related to the function identified by the identifying part of the functions whose identifying information are stored in the identifying information storage part of the apparatus on the display part in a mode that can be selected by a user.

According to a third aspect of the present invention, a method for controlling display of a function setting screen, the method being performed in an image processing system including an information processing apparatus and one or a plurality of image processing apparatuses that can be connected to the information processing apparatus via a network, wherein the information processing apparatus includes an identifying information storage part for storing identifying information given in advance in such a way as to be common between the information processing apparatus and the respective image processing apparatuses in a mode in which with respect to a function provided in the image processing apparatus, a set value of the function, and a function group into which the functions are grouped, a corresponding relationship between the function group, the function, and the function set value is described, and performs:

making screen information which includes identifying information of at least one of the function group, the function, and the function set value and which is used for displaying a function setting screen, and sending the screen information made in the step of making screen information to the image processing apparatus in response to an acquisition request from the image processing apparatus, and wherein the image processing apparatus includes an identifying information storage part for storing the identifying information of a kind of the function provided in the apparatus, a set value of the function, and the function group and, in a case where a function and/or a function set value are/is newly added, for also storing identifying information related to the added function and/or the added function set value, and performs:

sending an acquisition request of the screen information to the information processing apparatus;

receiving screen information sent from the information processing apparatus;

identifying a function whose function set value is to be displayed on the function setting screen from among identifying information included in the screen information received in the step of receiving; and displaying all function set values related to the function identified in the step of identifying of the functions whose identifying information are stored in the identifying information storage part of the apparatus on the display part in a mode which can be selected by a user.

According to a fourth aspect of the present invention, a non-transitory computer-readable recording medium having a program for controlling display of a function setting screen stored thereon to make a computer of an image processing apparatus, which can be connected to an information processing apparatus via a network, the information processing apparatus including an identifying information storage part for storing identifying information given in advance in common with each of the image processing apparatuses in a mode in which, with respect to one or a plurality of functions provided in each of the image processing apparatuses, a set value of the function, and a function group into which the functions are grouped, a corresponding relationship between the function group, the function, and the function set value is described, the image processing apparatus including an identifying information storage part for storing the identifying information related to a kind of the function provided in the apparatus, a set value of the function, and the function group and, in a case where a function and/or a function set value are/is newly added, for also storing the identifying information related to the added function and/or the added function set value, wherein the program makes the computer execute:

sending an acquisition request of the screen information, which includes identifying information of at least one of the function group, the function, and the function set value and is used for displaying the function setting screen, to the information processing apparatus;

receiving screen information sent from the information processing apparatus;

identifying a function whose function set value is to be displayed on the function setting screen from among identifying information included in the screen information received in the step of receiving; and displaying all function set values related to the function identified in the step of identifying of the functions whose identifying information are stored in the identifying information storage part of the apparatus on a display part in a mode that can be selected by a user.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 4 is a table to show identifying information stored in a data storage part of the image processing apparatus and a corresponding relationship between the respective identifying information;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
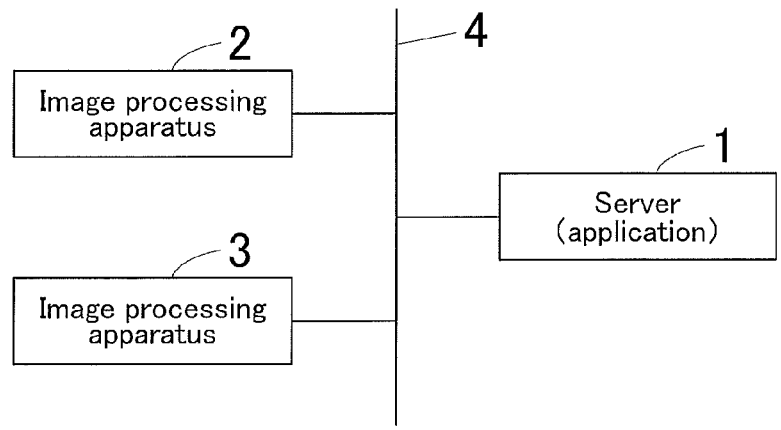
FIG. 1 is a construction view of an image processing system in which an image processing apparatus according to one embodiment of the present invention is used.

FIG. 1 is a construction view of an image processing system in which an image processing apparatus according to one embodiment of the present invention is used. In this image processing system, a server 1 as an information processing apparatus and a plurality of image processing apparatuses 2, 3 are connected to each other via a network 4.

The server 1 is constructed of a personal computer or the like and makes screen information for displaying a function setting screen in response to a request from the image processing apparatuses 2, 3 and sends the image information to the image processing apparatuses 2, 3 in this embodiment.

Figure 2:
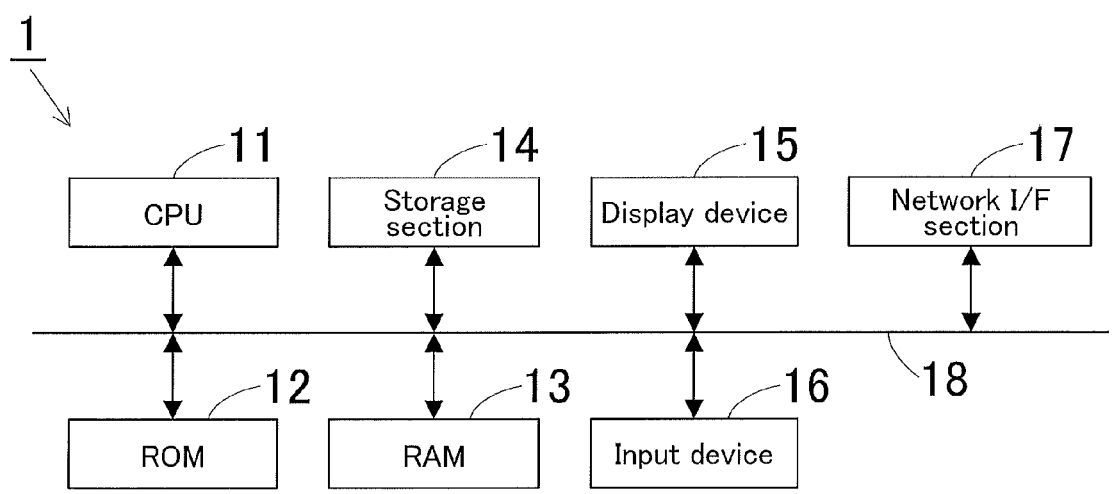
FIG. 2 is a block diagram to show a construction of a server used in the system of FIG. 1.

FIG. 2 is a block diagram to show a construction of the server 1.

The server 1 includes a CPU 11, a ROM 12, a RAM 13, a storage section 14, a display device 15, an input device 16, a network interface section (network I/F section) 17, and these respective devices and parts are connected to each other via a system bus 18.

The CPU 11 executes a program stored in the ROM 12 and the like to control the whole of the server 1 in a centralized manner. For example, in this embodiment, the CPU 11 performs processings of: receiving an acquisition request of the screen information from the image processing apparatuses 2, 3; making necessary screen information; and sending the made screen information to the image processing apparatuses 2, 3 having sent the acquisition request. In this regard, the screen information will be described later.

The ROM 12 is a storage medium for storing a program to be performed by the CPU 11, and the other information.

The RAM 13 is a storage medium for providing a work area when the CPU 11 operates in accordance with an operation program.

The storage section 14 is constructed of, for example, a hard disk drive and stores an application for making screen information for displaying the function setting screen described above, and the other software. Further, the storage section 14 stores identifying information indicating one or a plurality of functions provided in the image processing apparatuses 2, 3, function groups into which these functions are grouped, and function set values that are values used for setting the respective functions specifically (also simply referred to as "set value"). This identifying information will be described later.

The display device 15 is constructed of a CRT, a liquid crystal display device and the like, and displays various messages, an input reception screen and the like, and displays a document and the like made by a user.

The input device 16 is used for an input operation by a user and is constructed of a keyboard, a mouse, and the like.

The network interface section 17 functions as a communication part for sending and receiving information to and from the image processing apparatuses 2, 3 and the other external devices via the network 4.

In this embodiment, as the image processing apparatuses 2, 3 are used MFPs of multi-function digital image processing apparatuses having a plurality of functions such as a copying function and a printing function.

Figure 3:
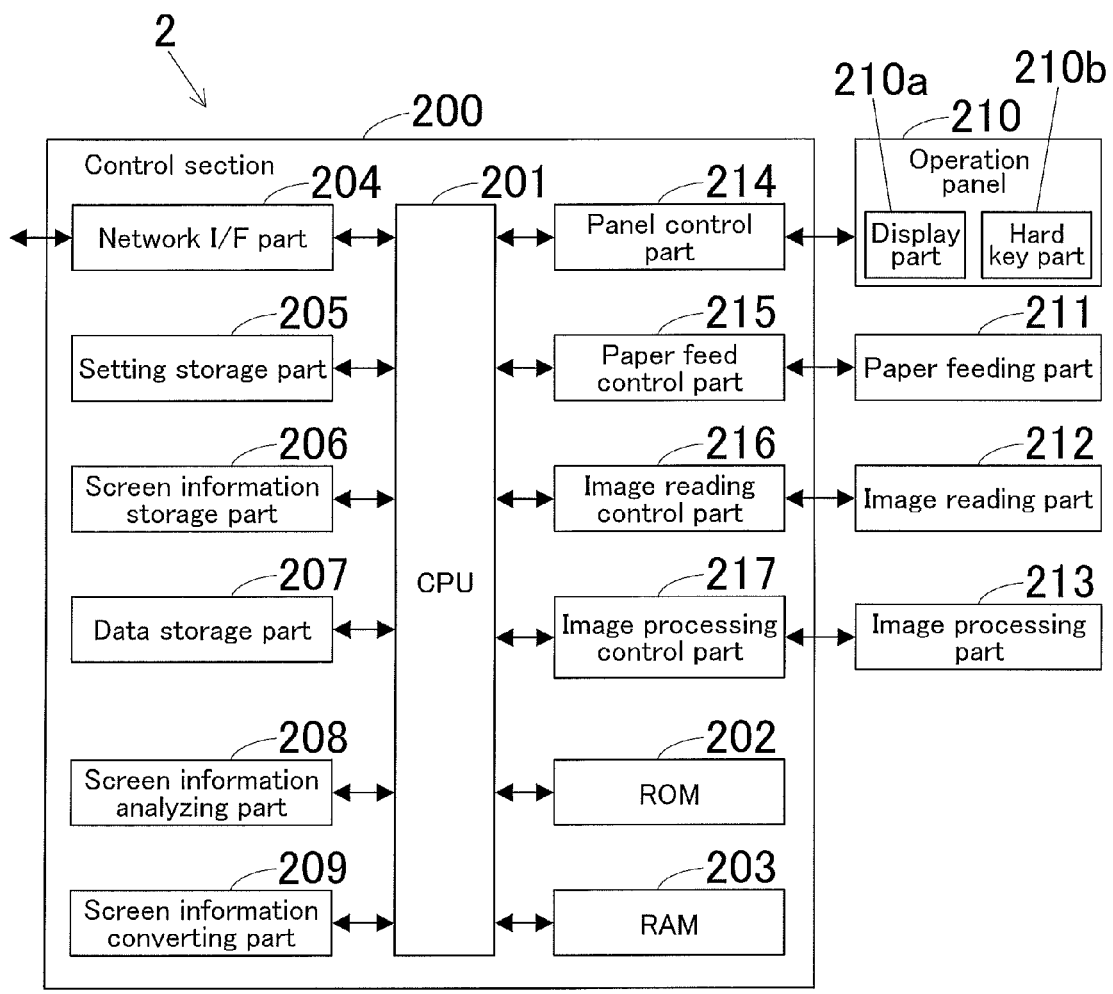
FIG. 3 is a block diagram to show a construction of the image processing apparatus used in the system of FIG. 1.

FIG. 3 is a block diagram to show a function construction of the image processing apparatuses 2, 3. In this regard, the function constructions of both the image processing apparatuses 2, 3 are identical, so that the function construction of the image processing apparatus 2 will be described, and the description of the construction of the image processing apparatus 3 will be omitted.

The image processing apparatus 2 includes a control section 200, an operation panel 210, a paper feeding part 211, an image reading part 212, and an image processing part 213. The control section 200 includes a CPU 201, a ROM 202, a RAM 203, a network interface (network I/F) part 204, a setting storage part 205, a screen information storage part 206, a data storage part 207, a screen information analyzing part 208, a screen information converting part 209, a panel control part 214, a paper feed control part 215, an image reading control part 216, and an image processing control part 217.

The CPU 201 controls the whole of the image processing apparatus 2 in a centralized manner. The ROM 202 is a memory for storing an operation program of the CPU 201, and the RAM 203 is a memory for providing a work area when the CPU 201 operates in accordance with the operation program.

The network interface part 204 conducts communications to and from the server 1 and the external devices such as a user terminal which are connected to each other through the network 4. For example, the network interface part 204 sends an acquisition request of screen information to the server 1 and receives the screen information from the server 1.

The setting storage part 205 stores a set value set by a user via the function setting screen displayed on a display part 210a of the operation panel 210, and the screen information storage part 206 stores screen information sent from the server 1, and the data storage part 207 stores identifying information to show a kind of one function or kinds of a plurality of functions provided in the image processing apparatus 2, a function group into which these functions are grouped, and a function set value for specifically setting each of the functions. In this regard, in a case where a function and/or a function set value are newly added to the image processing apparatus 2, identifying information of the added function and/or the added function set value are also stored in the data storage part 207. Further, a character string for displaying the names of the function and the function set value are also stored in the data storage part 207 in connection with each function and function set value. Still further, various applications and the other data are stored in the data storage part 207.

In this regard, each of the setting storage part 205, the screen information storage part 206, and the data storage part 207 is constructed of a storage medium, for example, a hard disk drive (HDD).

The screen information analyzing part 208 analyzes the screen information sent from the server 1 and identifies a function specified by the identifying information in the screen information.

The screen information converting part 209 determines the name of the function and the function set value, which are to be displayed on the function setting screen, on the basis of the function indentified by the screen information analyzing part 208. In other words, the screen information converting part 209 converts the screen information made by the server 1 to make the information of a screen to be actually displayed on the display part 210a. The CPU 201 displays the function setting screen on the display part 210a of the operation panel 210 on the basis of the screen information made in this way.

The operation panel 210 has the display part 210a and a hard key part 210b. The display part 210a is a part to display various operation screens such as the function setting screen, the state of the apparatus, and the message and is constructed of a touch panel type liquid crystal or the like. Further, the hard key part 210b is a part used by the user for an input operation or the like and has hard keys such as a ten key, a start key, and a stop key.

The paper feeding part 211 is a part to carry paper to a position in which an image is transferred to the paper by the image processing part 213 at the time of printing and to discharge the paper to the outside of the apparatus via a fixing device (not shown) after the image is transferred to the paper.

The image reading part 212 reads an original image and converts the original image to image information of electronic information.

The image processing part 213 is a part to print the image information of the original read by the image reading part 212 and image information sent from the external device such as the user terminal (not shown).

The panel control part 214 controls the operation panel 210, the paper feed control part 215 controls the paper feeding part 211, the image reading control part 216 controls the image reading part 212, and the image processing control part 217 controls the image processing part 213.

In this regard, the screen information analyzing part 208, the screen information converting part 209, the panel control part 214, the paper feed control part 215, the image reading control part 216, and the image processing control part 217 are realized, in reality, by parts of the functions of the CPU 201.

Next, the relationship between the function group, the function, and the function set value and the identifying information (also, simply referred to as ID) given in advance to these will be described.

FIG. 4A is a table to show identifying information stored in the data storage part 207 of the image processing apparatus 2 and a corresponding relationship between the respective identifying information. In this table, the function provided in the image processing apparatus 2 is classified into a category, a function group, a function, and a function set value.

For example, the table of FIG. 4A shows a category of a "scan" function, and this category is divided into two function groups of "reading setting" and "image adjustment".

Further, the function group of "reading setting" has three functions of "file format", "resolution", and "double side", and each of the functions has a function set value that is a value for setting the function. Specifically, the function of "file format" has two function set values of "PDF" and "Compact PDF", and the function of "resolution" has two function set values of "200 dpi" and "300 dpi", and the function of "double side" has two function set values of "double side" and "single side". In this regard, the function of "double side" means a function capable of scanning both of a double-sided printed original and a single-sided printed original, and the function set value of "double side" sets double-sided scan and the function set value of "single side" sets singled-sided scan.

On the other hand, the function group of "image adjustment" has two functions of "color" and "sharpness", and each of the functions has function set values of values for setting the function. Specifically, the function of "color" has two function set values of "full color" and "gray scale", and the function of "sharpness" has three function set values of "−1", "0", and "1".

The category of "scan", the two function groups of "reading setting" and "image adjustment", the five functions of "file format", "resolution", "double side", "color", and "sharpness", and the eleven function set values of "PDF", "Compact PDF", "200 dpi", "300 dpi", "double side", "single side", "full color", "gray scale", "−1", "0", and "1" each have identifying information given thereto in advance.

In addition, each of the identifying information has a corresponding relationship between the category, the function group, the function, and the function set value described therein in advance. That is, the identifying information is made in a mode in which: it can be recognized which category the function group belongs to; it can be recognized which function group the function belongs to; and it can be recognized which function the function set value belongs to.

Figure 5:
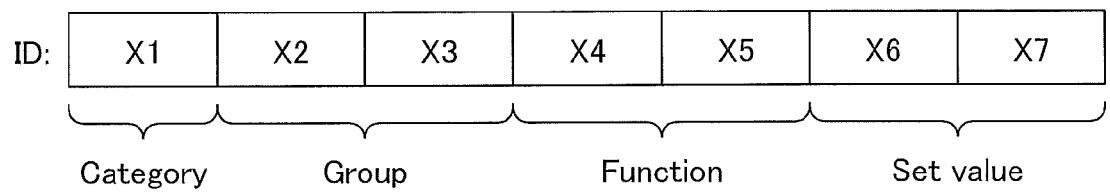
FIG. 5 is a view to show the identifying information.

Specifically, as shown in FIG. 5, the identifying information is constructed of information of 7 bits of X1 to X7, and the uppermost one digit of X1 identifies the category, and the next two digits of X2 and X3 identify the function group, and the further next two digits of X4 and X5 identify the function, and the lowermost two digits of X6 and X7 identify the function set value.

Figure 6:
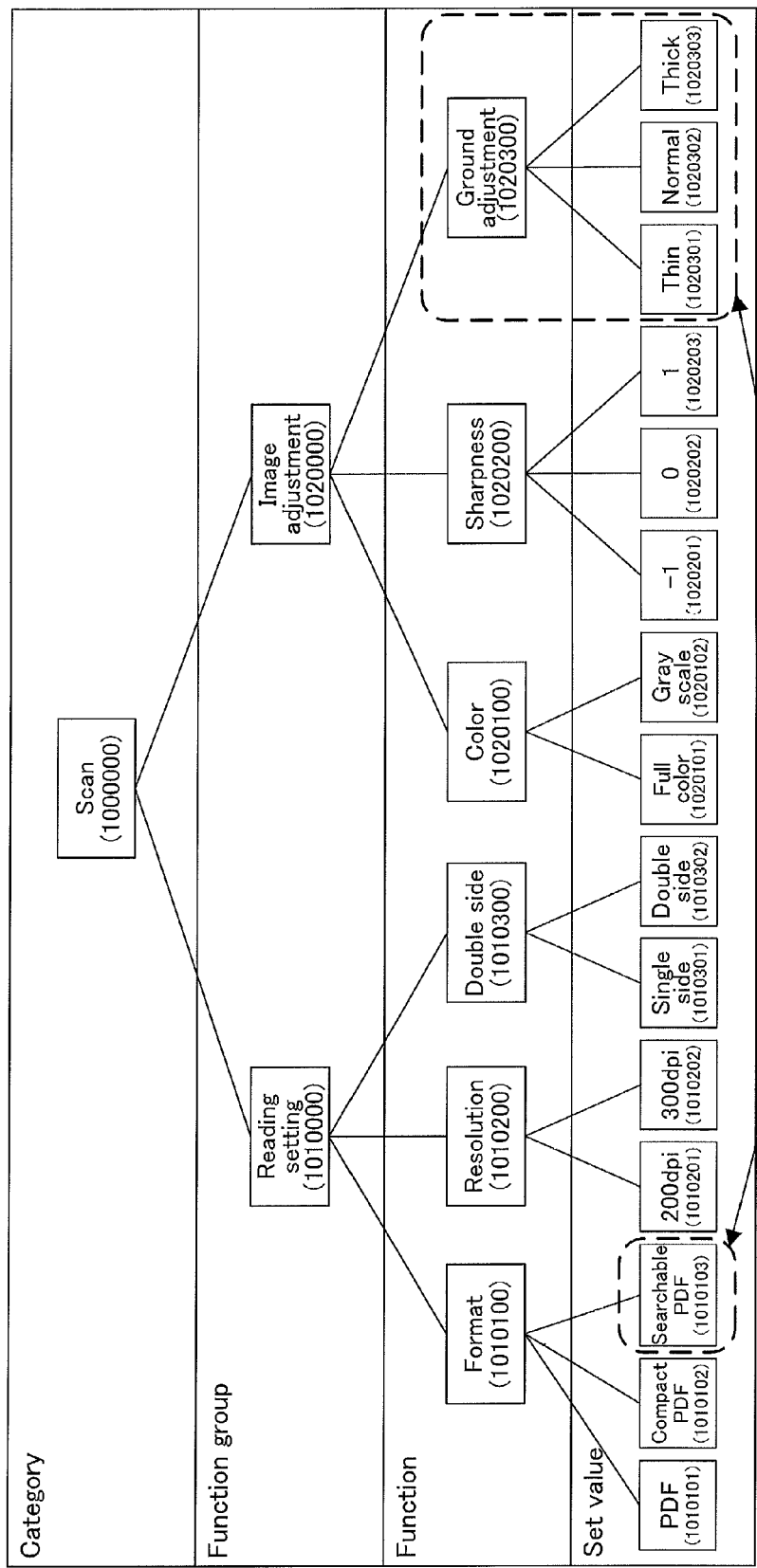
FIG. 6 is a view to show a relationship between a category, a function group, a function, and a function set value in the form of a tree.

Thus, in FIG. 4A, the identifying information of the category of "scan" is set at "1000000", the identifying information of the function group of "reading setting" is set at "1010000", the identifying information of the function group of "image adjustment" is set at "1020000", the identifying information of the function of "file format" is set at "1010100", and the identifying information of the function set value of "PDF" is set at "1010101". As is clear from the identifying information of FIG. 4A, in the identifying information of the function and the function set value belonging to the same function group, an identifying part of the function group is displayed by the same number, and in the identifying information of the function set value belonging to the same function, an identifying part of the function is displayed by the same number. Hence, the function group, the function, and the content of the function set value and the corresponding relationship between them can be recognized from the identifying information like this. FIG. 6 shows the relationship between the category, the function group, the function, and the function set value in the shape of a tree.

The identifying information is common to the server 1 and the image processing apparatuses 2, 3, and it is assumed that in an initial state, the function displayed by the identifying information of FIG. 4A is provided in the image processing apparatuses 2, 3 and that the respective pieces of the identifying information of FIG. 4A are stored in advance in the storage part 14 of the server 1 and are stored in advance in the data storage part 207 of the image processing apparatuses 2, 3.

FIG. 4B shows a state in which a new kind of function is provided in the image processing apparatus 3 and in which a new function set value is added to an existing function. That is, a new function of "ground adjustment" is provided in the image processing apparatus 3 and three function set values of "thin", "normal", and "thick" are set for the function of this "ground adjustment". Further, a new function set value of "Searchable PDF" is added to the existing function of "file format". In this regard, the newly provided function and the newly added function set value are also given identifying information in advance in accordance with the rule described above. The data storage part 207 of the image processing apparatus 3 stores the respective identifying information of FIG. 4B including the added identifying information, but in the server 1, an application for making the screen information is not updated but only the identifying information of FIG. 4A remains stored. Further, also the image processing apparatus 2 stores only the identifying information of FIG. 4A.

FIG. 7 is a view to show the operation of the image processing apparatus 2 when the function setting screen is displayed on the display part 210a of the operation panel 210 with reference to the screen information from the server 1.

Screen information 100 is sent from the server 1 in response to an acquisition request of screen information from the image processing apparatus 2. The screen information 100 includes the identifying information of at least one of the function group, the function, and the function set value. In this example, the screen information 100 includes the respective identifying information of (1010101, 1010102, 1010201, 1010202, 1010301, 1010302) of "PDF", "Compact PDF", "200 dpi", "300 dpi", "double side", and "single side" that are the function set values.

The image processing apparatus 2 receiving the screen information 100 analyzes the screen information 100 to identify a function whose function set value is to be displayed on the function setting screen from the functions provided in the image processing apparatus 2.

In this embodiment, it is assumed that a function, which is set by the respective function set value included in the screen information 100, and a function, which belongs to the same function group as the function, are identified as the functions whose function set values are to be displayed on the function setting screen. It is recommended that conditions for identifying the function whose function set value is to be displayed on the function setting screen from the identifying information included in the screen information are set in advance in the image processing apparatuses 2, 3. Of course, it is also recommended to employ a construction in which only the function set by the respective function set values included in the screen information 100 is identified as the function whose function set value is to be displayed on the function setting screen.

Figures 7A, 7B:
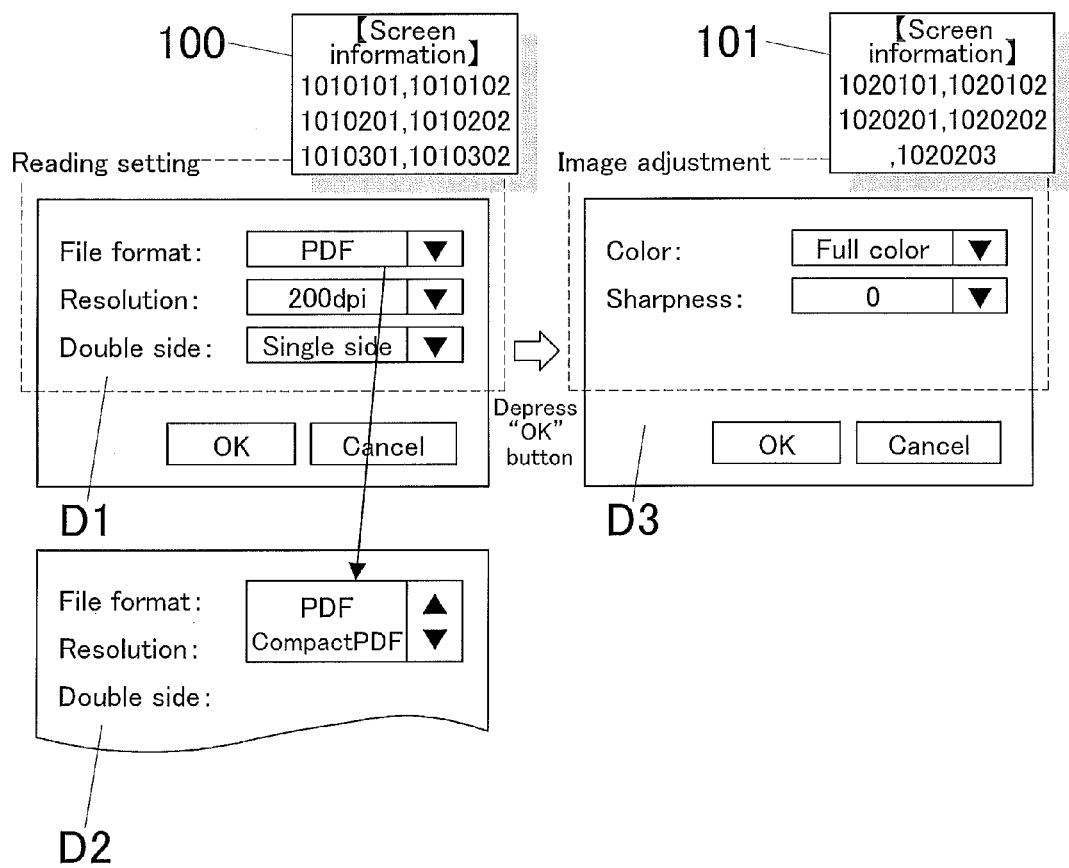
FIG. 7 is a view to show an operation of the image processing apparatus when a function setting screen is displayed on a display part of an operation panel on the basis of screen information from the server.

In the example of FIG. 7A, the function of "file format" is identified from the function set values of "PDF" and "Compact PDF", the function of "resolution" is identified from the function set values of "200 dpi" and "300 dpi", and the function of "double side" is identified from the function set values of "double side" and "single side". The other function which is identical in the function group to these respective identified functions of "file format", "resolution", and "double side" does not exist in the image processing apparatus 2, so that only the respective functions of "file format", "resolution", and "double side" are identified as the functions whose function set values are to be displayed on the function setting screen. It can be determined, as described above, by referring to the identifying part of the function group of the identifying information whether or not the other function is identical in the function group to the respective functions of "file format", "resolution", and "double side".

Of the function set values whose identifying information is stored in the data storage part 207, all function set values related to the respective identified functions of "file format", "resolution", and "double side" are displayed on the display part 210a of the operation panel 210.

Specifically, as shown by a function setting screen D1 of FIG. 7A, the names of the respective functions of "file format", "resolution", and "double side" and the function set values related to the respective functions, and an "OK" button and a "cancel" button are displayed on the display part 210a of the operation panel 210. The names of the respective functions and the function set values related to the respective functions are displayed by the use of a character string stored in the data storage part 207 in connection with the identifying information.

Here, the function set values related to the respective functions are displayed so as to be selectable by a pull-down menu display as shown in a function setting screen D2, and when the user selects a desired function set value from the respective function set values displayed in the pull-down menu, as shown in the function setting screen D1 of FIG. 7A, there is brought about a state in which only the selected function set value is displayed. The function setting screen D2 shows a state in which the set value of "file format" is displayed by the pull-down menu, and also the set values of "resolution" and "double side" are displayed in the same way.

In the function setting screen D1 of FIG. 7A, when the user depresses the "OK" button, the set value is fixed, and the fixed set value is stored in the screen information storage part 206. At the same time, the image processing apparatus 2 sends an acquisition request of the next screen information to the server 1. The server 1 receives this acquisition request and sends screen information 101 to the image processing apparatus 2.

The screen information 101 includes the respective identifying information of (1020101, 1020102, 1020201, 1020202, 1020203) of "full color" and "gray scale", which are the function set values related to the function of "color", and of "−1", "0", and "1" which are the function set values related to the function of "sharpness".

The image processing apparatus 2 receiving the screen information 101 analyzes the screen information 101 to identify a function whose function set value is to be displayed on the function setting screen from the functions provided in the image processing apparatus 2. In the example of FIG. 7B, the function of "color" is identified from the function set values of "full color" and "gray scale", and the function of "sharpness" is identified from the function set values of "−1", "0", and "1". The other function which is identical in the function group to the respective identified functions of "color and "sharpness" does not exist in the image processing apparatus 2, so that only the respective functions of "color" and "sharpness" are identified as the functions whose function set values are to be displayed on the function setting screen.

Of the function set values whose identifying information is stored in the data storage part 207, all function set values related to the respective identified functions of "color and "sharpness" are displayed on the display part 210a of the operation panel 210.

In the example of FIG. 7B, as shown by a function setting screen D3, the names of the respective functions of "color" and "sharpness", the function set values related to the respective functions, and the "OK" button and the "cancel" button are displayed on the display part 210a of the operation panel 210. In this regard, as in the case of the function setting screen D2 of FIG. 7A, the function set values related to the respective functions are displayed so as to be selectable by the pull-down menu display, and when the user selects a desired function set values from among the respective function set values displayed by the pull-down menu, as shown by the function setting screen D3 of FIG. 7B, there is brought about a state in which only the selected function set values are displayed. When the user depresses the "OK" button, the set values are fixed.

In this way, while displaying one or the plurality of function setting screens, the user sets the function set values.

FIG. 8 is a view to show the operation of the image processing apparatus 3 when the function setting screen is displayed on the display part 210a of the operation panel 210 with reference to the screen information from the server 1.

Screen information 103 is sent from the server 1 in response to the acquisition request of the screen information from the image processing apparatus 3. The screen information 103 has the same content as the screen information 100 shown in FIG. 7A and includes the respective identifying information of (1010101, 1010102, 1010201, 1010202, 1010301, 1010302) of "PDF", "Compact PDF", "200 dpi", "300 dpi", "double side", and "single side" that are the function set values.

Figures 8A, 8B:
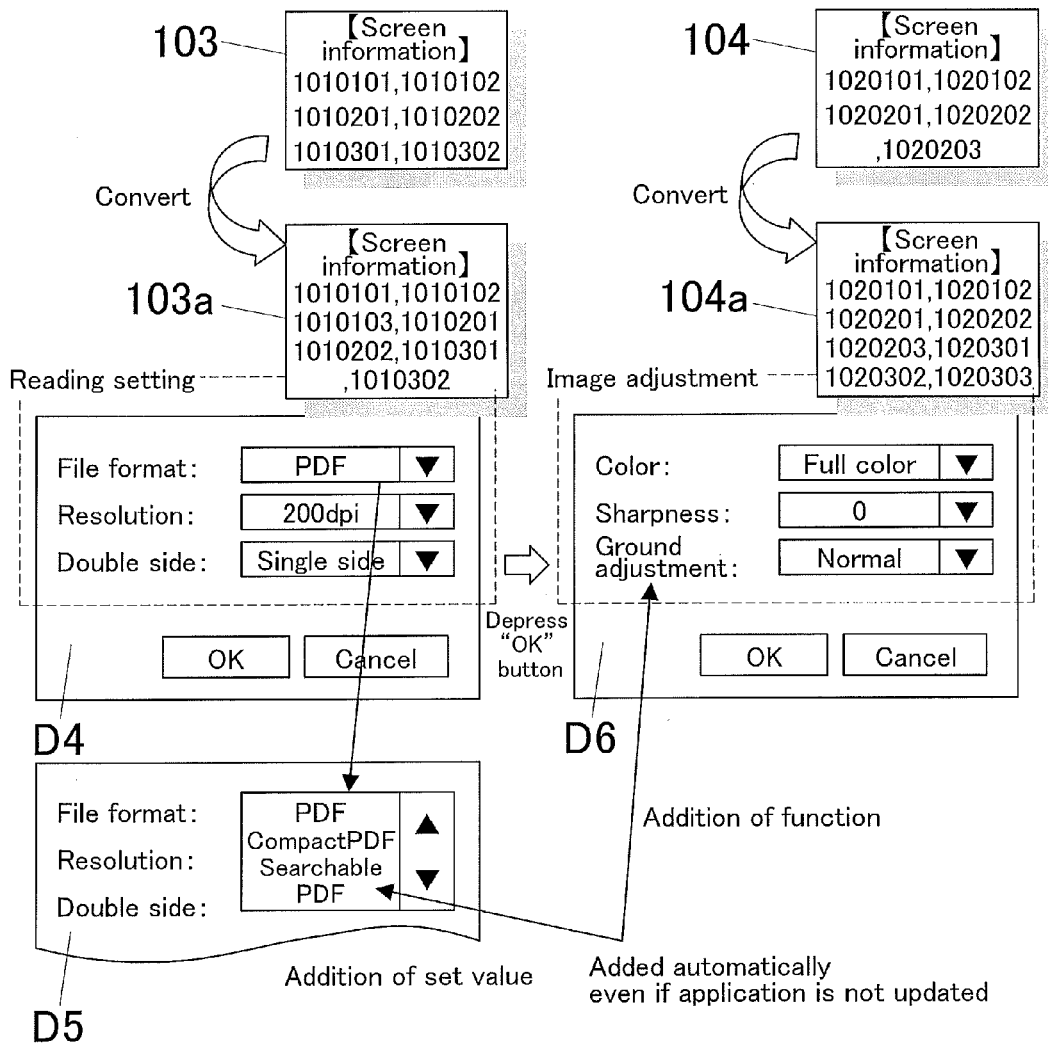
FIG. 8 is a view to show an operation of another image processing apparatus when a function setting screen is displayed on a display part of an operation panel on the basis of screen information from a server.

The image processing apparatus 3 having received the screen information 103 analyzes the screen information 103 to identify the function whose function set value is to be displayed on the function setting screen from among the functions provided in the image processing apparatus 3. In the example of FIG. 8A, the image processing apparatus 3 identifies the function of "file format" from the function set values of "PDF" and "Compact PDF" and identifies the function of "resolution" from the function set values of "200 dpi" and "300 dpi" and identifies the function of "double side" from the function set values of "double side" and "single side".

The other function which is identical in the function group to these respective identified functions of "file format", "resolution", and "double side" does not exist in the image processing apparatus 3, so that only the respective functions of "file format", "resolution", and "double side" are identified as the functions whose function set values are to be displayed on the function setting screen. Of the function set values whose identifying information are stored in the data storage part 207, all function set values related to the respective identified functions of "file format", "resolution", and "double side" are displayed on the display part 210a of the operation panel 210.

As described above, the image processing apparatus 3 has the new function set value of "Searchable PDF" added to the existing function of "file format", so that also the function set value of "Searchable PDF" is displayed so as to be selectable by the user. Thus, the image processing apparatus 3 converts the screen information 103 to screen information 103a including the function set values to be actually displayed, and a function setting screen D4 is displayed on the display part 210a of the operation panel 210 on the basis of this screen information 103a. On this function setting screen D4 are displayed the names of the respective functions of "file format", "resolution", and "double side" and the function set values related to the respective functions, and the "OK" button and the "cancel" button. Further, as shown by a function setting screen D5, also the function set value of "Searchable PDF" added to the image processing apparatus 3 is displayed so as to be selectable in the pull-down menu of the function set value of the function of "file format".

In the function setting screen D4 of FIG. 8A, when the user depresses the "OK" button, the set value is fixed and stored and the image processing apparatus 3 sends an acquisition request of the next screen information to the server 1. When the server 1 receives this acquisition request, the server 1 sends screen information 104 to the image processing apparatus 3.

The screen information 104 includes the respective identifying information of (1020101, 1020102, 1020201, 1020202, 1020203) of "full color" and "gray scale", which are the function set values related to the function of "color", and of "−1", "0", and "1" which are the function set values related to the function of "sharpness".

The image processing apparatus 3 having received the screen information 104 analyzes the screen information 104 to identify the function whose function set value is to be displayed on the function setting screen from among the functions provided in the image processing apparatus 3. In the example of FIG. 8B, the function of "color" is identified from the function set values of "full color" and "gray scale" and identifies the function of "sharpness" from the function set values of "−1", "0", and "1". The image processing apparatus 3 has the function of "ground adjustment" provided therein as another function belonging to "image adjustment", which is the same function group of as these respective identified functions of "color" and "sharpness", so that the function of "ground adjustment" is also identified as the function whose function set value is to be displayed on the function setting screen.

Then, of the function set values whose identifying information are stored in the data storage part 207, all function set values of the respective identified functions of "color", "sharpness", and "ground adjustment" are displayed on the display part 210a of the operation panel 210.

Thus, the image processing apparatus 3 converts the screen information 104 to screen information 104a including the function set values to be actually displayed, and a function setting screen D6 is displayed on the display part 210a of the operation panel 210 on the basis of this screen information 104a. On this function setting screen D6 are displayed the names of the respective functions of "color", "sharpness", and "ground adjustment", the function set values related to the respective functions, and the "OK" button and the "cancel" button. In this regard, as in the case of the function setting screen D5 of FIG. 8A, the function set values related to the respective functions are displayed so as to be selectable by the pull-down menu. When the user selects a desired function set value from among the respective function set values displayed by the pull-down menu, as shown by the function setting screen D6 of FIG. 8B, there is brought about a state in which only the selected function set values are displayed.

In this way, in this embodiment, a function set by the function set value and a function belonging to the same function group as the function are identified as the functions whose function set values are to be displayed on the function setting screen from the screen information including the identifying information of the function set value, and, of the identifying information stored in the data storage part 207 of the image processing apparatuses 2, 3, all function set values related to the identified functions are displayed on the display part 210a of the operation panel 210 so as to be selectable by the user. For this reason, even if a new function set value related to an existing function or a new function is added to the image processing apparatus 2 or 3, when a construction is employed in which the function having the new function set value added thereto or the added new function is identified on the basis of the screen information, even if an application for forming the function setting screen of the server 1 is not updated, the newly added function set value or the function set value related to the newly added function can be displayed on the image processing apparatus. In this way, the user can set the function that does not exist as information in the server 1 by the image processing apparatus.

Figure 9:
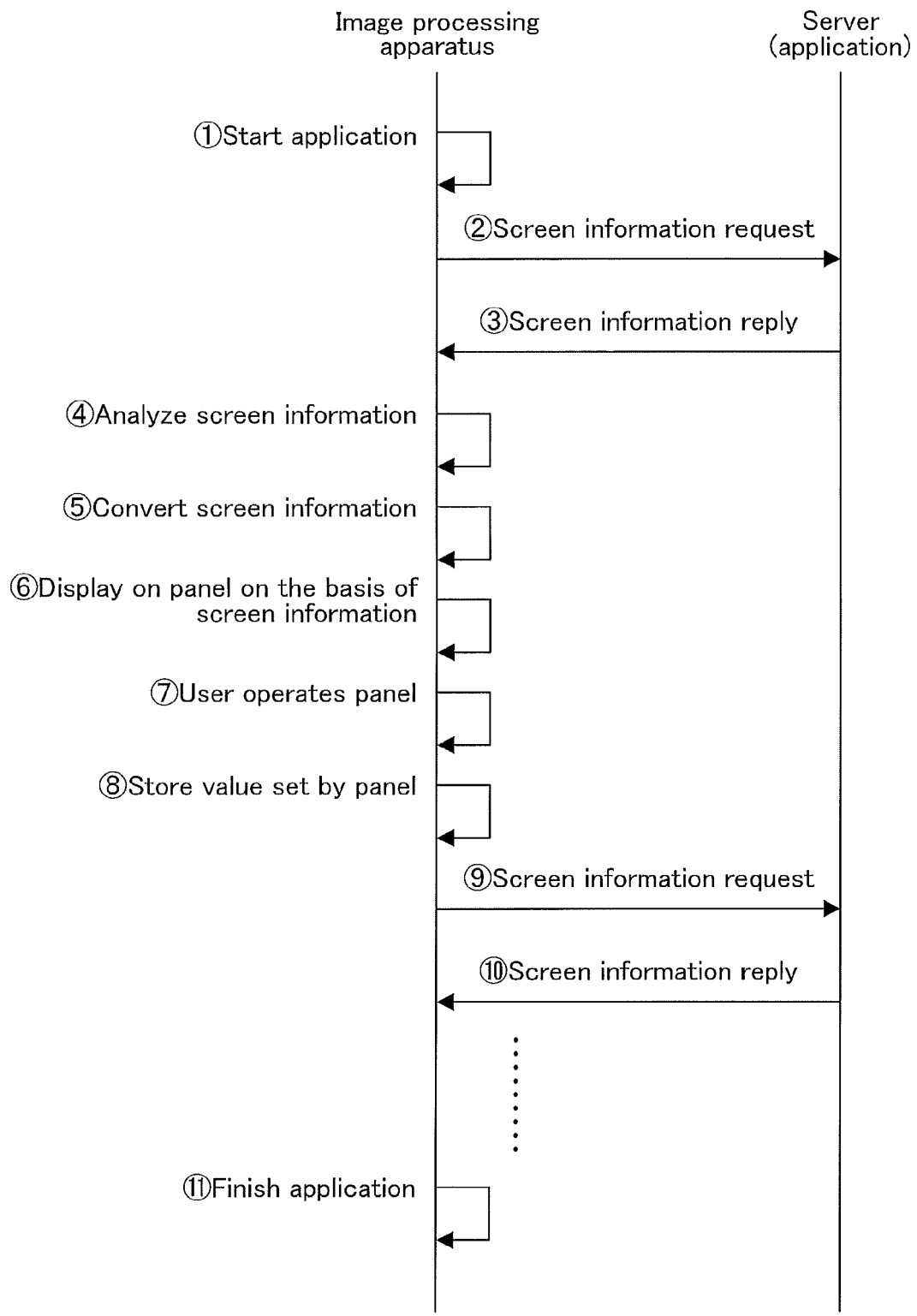
FIG. 9 is a view to show operations of the server and the image processing apparatus.

FIG. 9 is a view to show the operation of the server 1 and the image processing apparatus 3. The operation of the image processing apparatus 2 is the same as FIG. 9.

First, an application for displaying a function setting screen in the image processing apparatus 3 is started (encircled number 1), and an acquisition request of screen information is sent to the server 1 from the image processing apparatus 3 (encircled number 2).

The server 1 makes screen information for the acquisition request of the screen information and sends the made screen information to the image processing apparatus 3 (encircled number 3).

The image processing apparatus 3 analyzes the received screen information (encircled number 4) and converts the screen information in such a way that the function set value added to the existing function and a function set value related to the new function are displayed (encircled number 5) and displays a function setting screen on the display part 210a of the operation panel 210 on the basis of the converted screen information (encircled number 6).

When the user operates the operation panel 210 (encircled number 7), the image processing apparatus 3 stores the function set value set by the user via the function setting screen (encircled number 8) and makes an acquisition request of the next screen information to the server 1 (encircled number 9).

The server 1 makes the next screen information for the acquisition request of the screen information and sends the made screen information to the image processing apparatus 3 (encircled number 10). Hereinafter, the operations of the encircled numbers 4 to 10 are repeatedly performed until the necessary setting of the functions is finished.

When the necessary setting of the functions is finished, the image processing apparatus 3 finishes the application (encircled number 11).

Figure 10:
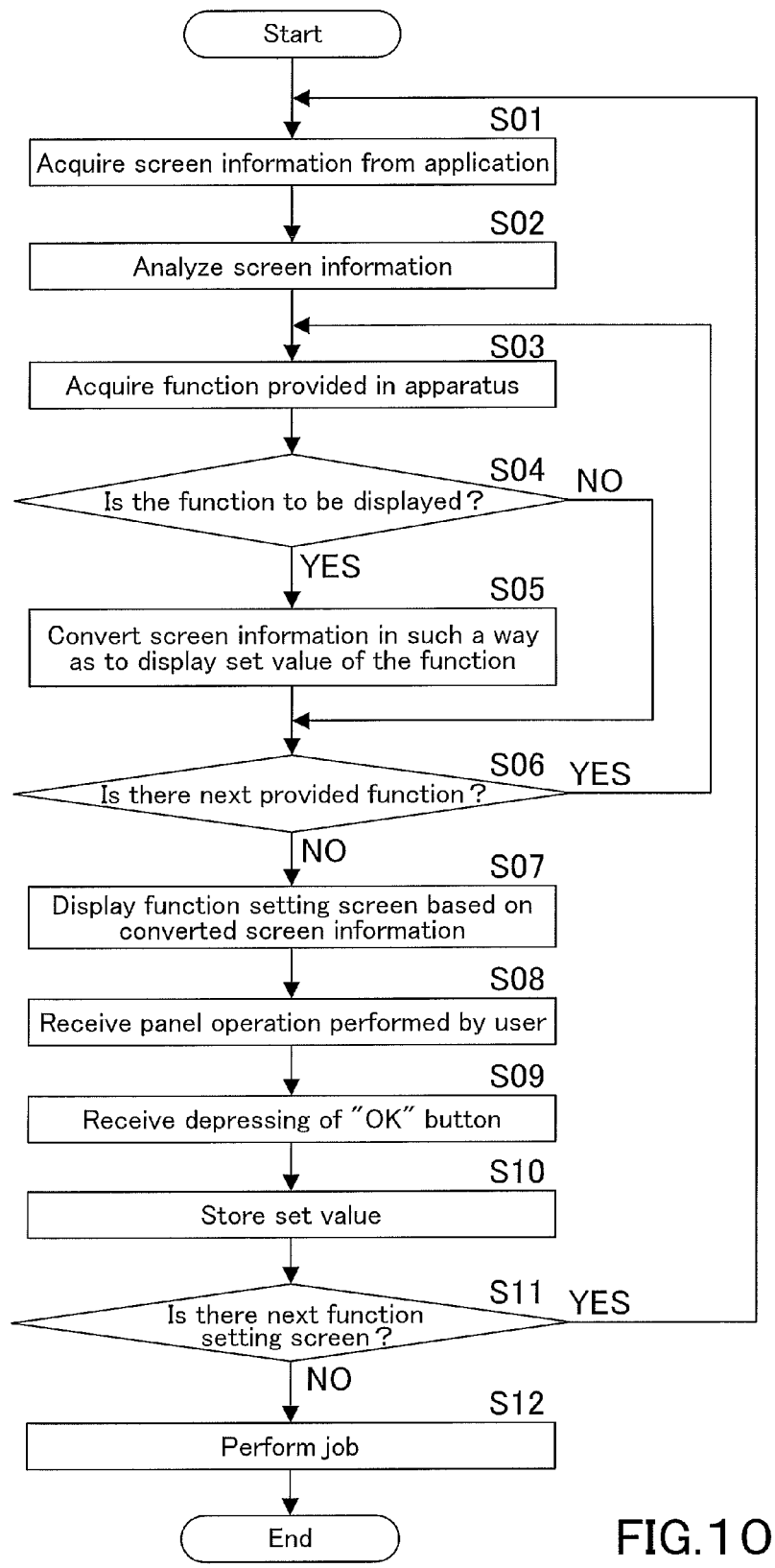
FIG. 10 is a flow chart to show a processing of controlling display of a function setting screen, the processing being performed by the image processing apparatus in the embodiment shown in FIG. 8.

FIG. 10 is a flow chart to show a processing of controlling display of a function setting screen, the processing being performed by the image processing apparatus 3 in the embodiment described in FIG. 8. This processing is performed by the CPU 201 of the image processing apparatus 3 in accordance with an operation program recorded in a recording medium such as the ROM 202. Further, also a processing of controlling display of a function setting screen that is performed by the image processing apparatus 2 is performed in the same way.

In step S01, screen information is acquired from the server 1 (application) and in step S02, the screen information is analyzed.

Next, in step S03, one function provided in the image processing apparatus 3 is acquired. Specifically, one of identifying information of the functions stored in the data storage part 207 is acquired.

In step S04, it is determined whether or not the acquired function is a function to be displayed. Specifically, it is determined whether or not the acquired function is a function set by a function set value included in the screen information or whether or not the acquired function is a function belonging to the same function group as the function set by the function set value included in the screen information.

If the acquired function is the function set by the function set value included in the screen information or is the function belonging to the same function group as the function set by the function set value included in the screen information (YES in step S04), the screen information is converted in step S05 in such a way that all of the function set values related to the function are displayed, and then the processing proceeds to step S06. If the acquired function is not the function set by the function set value included in the screen information or is not the function belonging to the same function group as the function set by the function set value included in the screen information (NO in step S04), the processing proceeds to step S06 without performing any step.

In step S06, it is determined whether or not there is the next function provided in the image processing apparatus 3, and if there is the next function (YES in step S06), the processing returns to step S03 and the steps S03 to S06 are repeated until the determination of step S06 for all of the functions provided in the image processing apparatus 3 is finished. If the determination of step S06 is made for all of the functions provided in the image processing apparatus 3 (NO in step S06), the processing proceeds to step S07.

In step S07, the function setting screen based on the converted screen information is displayed on the display part 210a of the operation panel 210.

Next, in step S08, a panel operation by the user, specifically, the selection of the function set value is received, and in step S09, the depressing of the "OK" button is received. In step S10, the function set value fixed by the depressing the "OK" button is stored, and in step S11 it is determined whether or not there is the next function setting screen.

If it is determined that there is the next function setting screen (YES in step S11), the processing returns to step S01 in which the next screen information is acquired from the server 1. If it is determined that there is not the next function setting screen (NO in step S11), a job is performed with the set function set value in step S12.

FIG. 11 is a view to show another embodiment of this invention. This embodiment shows an example in which the screen information made by the server 1 is made to include the identifying information of the function to thereby make it possible for the image processing apparatus 3 to identify a function whose function set value is to be displayed.

Screen information 105 is sent from the server 1 in response to an acquisition request of the screen information from the image processing apparatus 3. The screen information 105 includes the identifying information of at least one function. In this example, the screen information 105 includes the identifying information of 1010100 of the function of "file format", the identifying information of 1010200 of the function of "resolution", and the identifying information of 1010300 of the function of "double side".

The image processing apparatus 3 having received the screen information 105 analyzes the screen information 105 to identify a function whose function set value is to be displayed on the function setting screen from among the functions provided in the image processing apparatus 3. In the example of FIG. 11 is provided a construction in which a function included in the screen information 105 and a function belonging to the same function group as the function are identified as the functions whose function set values are to be displayed on the function setting screen.

In the example of FIG. 11, the functions ("file format", "resolution", and "double side") included in the screen information 105 are identified as the functions whose function set values are to be displayed on the function setting screen. Of the functions whose identifying information are stored in the data storage part 207, all function set values related to the identified functions of "file format", "resolution", and "double side" are displayed on the display part 210a of the operation panel 210.

In the image processing apparatus 3, a new function set value of "Searchable PDF" is added to the existing function of "file format", so that also the function set value of "Searchable PDF" is displayed so as to be selectable by the user. Thus, the image processing apparatus 3 converts the screen information 105 to screen information 105a including the function set value to be actually displayed, and a function setting screen D7 is displayed on the display part 210a of the operation panel 210 on the basis of this screen information 105a.

On this function setting screen D7 are displayed the names of the respective functions of "file format", "resolution", and "double side", the function set values related to the respective functions, and the "OK" button and the "cancel" button. On the pull-down menu of the function set value of the function of "file format", also the function set value of "Searchable PDF" added to the image processing apparatus 3 is displayed so as to be selectable.

Figure 11A:
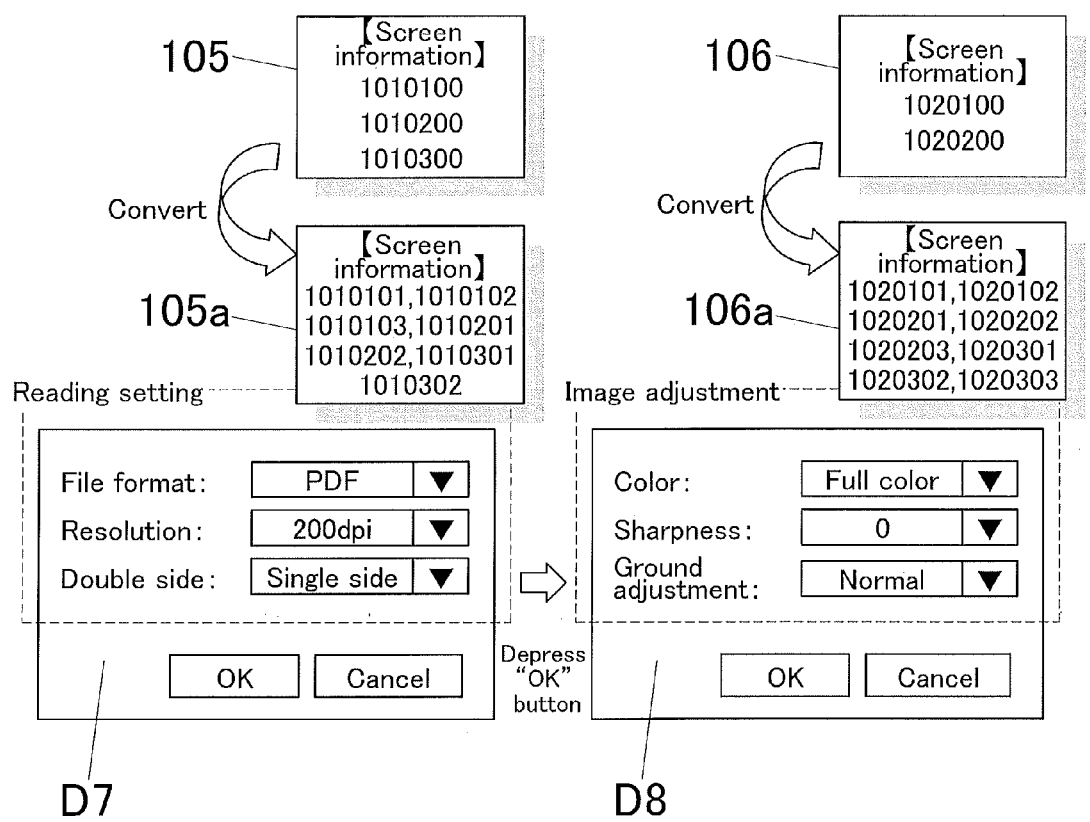
FIG. 11 is a view to show another embodiment of this invention.

In the function setting screen D7 of FIG. 11A, when the user depresses the "OK" button, the set value is fixed and stored and the image processing apparatus 3 makes an acquisition request of the next screen information to the server 1. The server 1 receives this acquisition request and sends screen information 106 to the image processing apparatus 3.

The screen information 106 includes the respective identifying information of the identifying information of 1020100 of the function of "color" and the identifying information of 1020200 of the function of "sharpness".

The image processing apparatus 3 having received the screen information 106 analyzes the screen information 106 to identify the function whose function set value is to be displayed on the function setting screen from among the functions provided in the image processing apparatus 3.

In the image processing apparatus 3, the function of "ground adjustment" is newly provided as the function belonging to the function group of "image adjustment" in addition to the functions of "color" and "sharpness", so that not only the respective functions of "color" and "sharpness" included in the screen information 106 but also the function of "ground adjustment" belonging to the same function group is identified as the function whose function set value is to be displayed.

Thus, the image processing apparatus 3 converts the screen information 106 to screen information 106a including the function set value to be actually displayed, and a function setting screen D8 is displayed on the display part 210a of the operation panel 210 on the basis of this screen information 106a. On this function setting screen D8 are displayed the names of the respective functions of "color", "sharpness", and "ground adjustment", the function set values related to the respective functions, and the "OK" button and the "cancel" button. In this regard, the function set values related to the respective functions are displayed so as to be selectable by the pull-down menu display, and when the user selects the desired function set values from among the respective function set values displayed by the pull-down menu display, as shown by the function setting screen D8 of FIG. 8B, there is brought about a state in which only the selected function set values are displayed.

In this way, in this embodiment, from the screen information including the identifying information of the function, a function set by the function set value and a function belonging to the same function group as the function are identified as the functions whose function set values are to be displayed on the function setting screen, and of the identifying information stored in the data storage parts 207 of the image processing apparatuses 2, 3, all function set values related to the identified functions are displayed on the display part 210a of the operation panel 210 so as to be selectable by the user. For this reason, even if the image processing apparatus 2 or 3 has a new function set value relating to an existing function or a new function added thereto, if there is employed a construction in which the function having the new function set value added thereto or the newly added function are identified on the basis of the screen information, even if an application for forming a function setting screen of the server 1 is not updated, the added function set value and the function set value of the new function can be displayed on the image processing apparatus 2 or 3. In this way, the user can set a function not existing as information in the server 1 in the image processing apparatus 2 or 3.

In this regard, the operation of the image processing apparatus 3 in this embodiment shown in FIG. 11 is performed in the same way as the flow chart of FIG. 10.

FIG. 12 is a view to show still another embodiment of this invention. This embodiment shows an example in which the screen information made by the server 1 is made to include the identifying information of the function group to thereby make it possible for the image processing apparatus 3 to identify a function whose function set value is to be displayed.

Screen information 107 is sent from the server 1 in response to an acquisition request of the screen information from the image processing apparatus 3. The screen information 107 includes the identifying information of at least one function group. In this example, the screen information 107 includes identifying information of 1010000 of the function group of "reading setting".

The image processing apparatus 3 having received the screen information 107 analyzes the screen information 107 to identify a function whose function set value is to be displayed on the function setting screen from among the functions provided in the image processing apparatus 3. The example of FIG. 12 employs a construction in which a function belonging to the function group included in the screen information 107 is identified as a function whose function set value is to be displayed on the function setting screen.

In the example of FIG. 12, the functions ("file format", "resolution", and "double side") belonging to the function group of "reading setting" are identified as functions whose function set values are to be displayed on the function setting screen. Of the functions whose identifying information are stored in the data storage part 207, all function set values related to the identified functions of "file format", "resolution", and "double side" are displayed on the display part 210*a* of the operation panel 210.

In the image processing apparatus 3, a new function set value of "Searchable PDF" is added to the existing function of "file format", so that also the function set value of "Searchable PDF" is displayed so as to be selectable by the user. Thus, the image processing apparatus 3 converts the screen information 107 to screen information 107*a* including the function set value to be actually displayed, and a function setting screen D9 is displayed on the display part 210*a* of the operation panel 210 on the basis of this screen information 107*a*. On this function setting screen D9 are displayed the names of the respective functions of "file format", "resolution", and "double side", the function set values related to the respective functions, and the "OK" button and the "cancel" button, whereas on the pull-down menu of the function set value of the function of "file format", also the function set value of "Searchable PDF" added to the image processing apparatus 3 is displayed so as to be selectable.

Figures 12A, 12B:
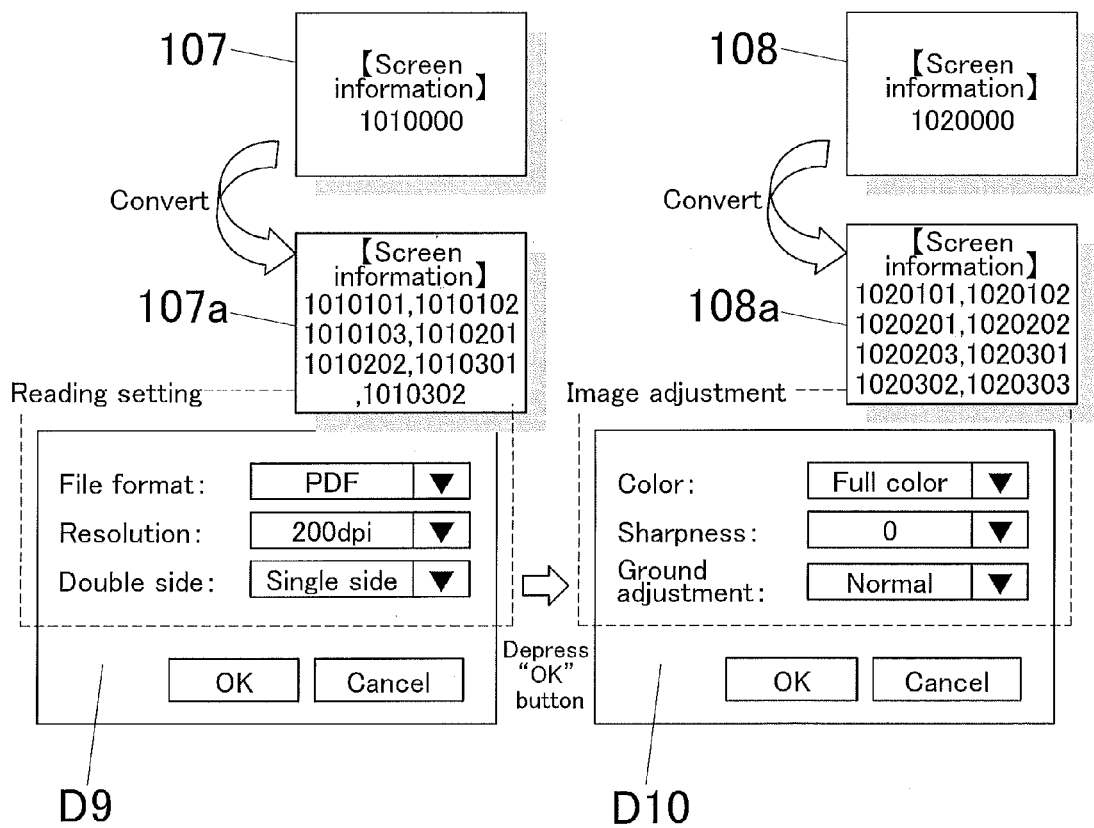
FIG. 12 is a view to show still another embodiment of this invention.

In the function setting screen D9 of FIG. 12A, when the user depresses the "OK" button, the set value is fixed and stored, and the image processing apparatus 3 makes an acquisition request of the next screen information to the server 1. The server 1 receives this acquisition request and sends screen information 108 to the image processing apparatus 3.

The screen information 108 includes the identifying information of 1020000 of the function group of "image adjustment".

The image processing apparatus 3 having received the screen information 108 analyzes the screen information 108 to identify the function whose function set value is to be displayed on the function setting screen from among the functions provided in the image processing apparatus 3.

In the image processing apparatus 3, in addition to the functions of "color" and "sharpness", the function of "ground adjustment" is newly provided as the function belonging to the function group of "image adjustment", so that these functions of "color", "sharpness", and "ground adjustment" are identified as the functions whose function set values are to be displayed.

Thus, the image processing apparatus 3 converts the screen information 108 to screen information 108*a* including the function set value to be actually displayed, and a function setting screen D10 is displayed on the display part 210*a* of the operation panel 210 on the basis of this screen information 108*a*. On this function setting screen D10 are displayed the names of the respective functions of "color", "sharpness", and "ground adjustment", the function set values related to the respective functions, and the "OK" button and the "cancel" button. In this regard, the function set values related to the respective functions are displayed so as to be selectable by the pull-down menu display, and when the user selects the desired function set values from among the respective function set values displayed by the pull-down menu display, as shown by a function setting screen D10 of FIG. 12B, there is brought about a state in which only the selected function set values are displayed.

In this way, in this embodiment, a function belonging to the function group is identified as a function whose function set value is to be displayed on the function setting screen from the screen information including the identifying information of the function group, and of the identifying information stored in the data storage part 207 of the image processing apparatuses 2, 3, all function set values related to the identified functions are displayed on the display part 210*a* of the operation panel 210 so as to be selectable by the user. For this reason, even if the image processing apparatus 2 or 3 has a new function set value relating to an existing function or a new function added thereto, if there is employed a construction in which the function having the new function set value added thereto or the newly added function is identified on the basis of the screen information, even if an application for forming a function setting screen of the server 1 is not updated, the added function set value and the function set value of the new function can be displayed on the image processing apparatus. In this way, the user can set a function not existing as information in the server 1 in the image processing apparatus 2 or 3.

In this regard, the operation of the image processing apparatus 3 in the embodiment shown in FIG. 12 is performed in the same way as the flow chart of FIG. 10 except that whether or not the function is the function to be displayed is determined in step S04 in the flow chart of FIG. 10 by determining whether or not the acquired function belongs to the function group included in the screen information.

Figure 13:
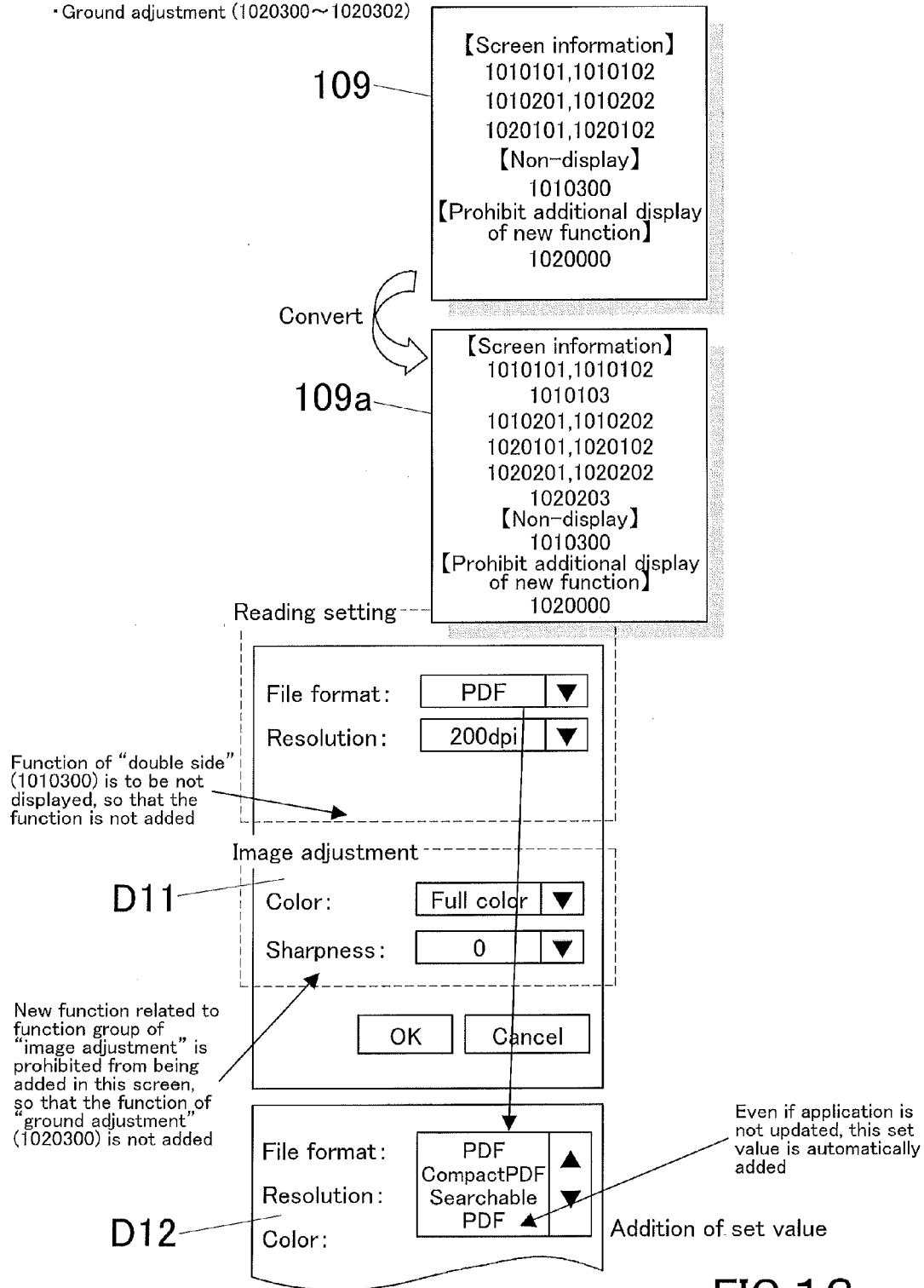
FIG. 13 is a view to show still another embodiment of this invention.

FIG. 13 is a view to show still another embodiment of this invention. This embodiment is constructed in such a way that the screen information is made to include the identifying information of a function which is indicated not to be displayed on the function setting screen and/or the identifying information of a function which is prohibited from being additionally displayed on the function setting screen to thereby prevent the function set values related to these functions from being displayed on the function setting screen.

Screen information 109 is sent from the server 1 in response to an acquisition request of the screen information from the image processing apparatus 3. The screen information 109 includes the respective identifying information of (1010101, 1010102, 1010201, 1010202, 1020101, 1020102) of "PDF", "Compact PDF", "200 dpi", "300 dpi", "full color", and "gray scale" that are the function set values.

The screen information 109 further includes the identifying information of 1010300 of the function of "double side" as identifying information to show a non-display function and the identifying information of 1020000 of the function group of "image adjustment" as identifying information to show a function group in which a new function is prohibited from being additionally displayed. The function that is not to be displayed and the function group in which a new function is prohibited from being additionally displayed are set in advance in the application of the server 1.

The image processing apparatus 3 having received the screen information 109 analyzes the screen information 109 to identify a function whose function set value is to be displayed on the function setting screen from among the functions provided in the image processing apparatus 3.

In this embodiment, a function set by the function set values included in the screen information 109 and a function belonging to the same function group as the function are identified as the functions whose function set values are to be displayed on the function setting screen. Hence, the respective functions of "file format", "resolution", "double side", "color", "sharpness", and "ground adjustment" are identified as the functions whose function set values are to be displayed on the function setting screen.

However, the screen information 109 includes the identifying information of the function of "double side" as a function not to be displayed, so that as to the function of "double side", the name of the function and the function set value are not displayed. Further, the screen information 109 includes the identifying information of the function group of "image adjustment" as identifying information to show the function group in which a new function is prohibited from being additionally displayed, so that also as to the function of "ground adjustment" of a function newly added to the image processing apparatus 3, the name of the function and the function set value are not displayed. In this regard, in order to make it clear whether or not a function is a function that is not recognized by the application of the server 1, that is, a newly provided function, it is recommended to give information to show that the function is a newly provided function.

As a result, a function setting screen D11 to be displayed on the display part 210*a* of the operation panel 210 on the basis of the screen information 109 is a screen shown in FIG. 13. In this regard, a function setting screen D12 is a screen to display the function set value of the "file format" by the pull-down menu display.

In this way, in this embodiment, the screen information is made to include the identifying information to identify the function that is indicated not to be displayed on the function setting screen and the identifying information to identify the function group in which a new function is prohibited from being additionally displayed, so that it is possible not to display the function set value related to the function. Thus, this is convenient for a user that desires the function set value of some functions not to be displayed.

Figure 14:
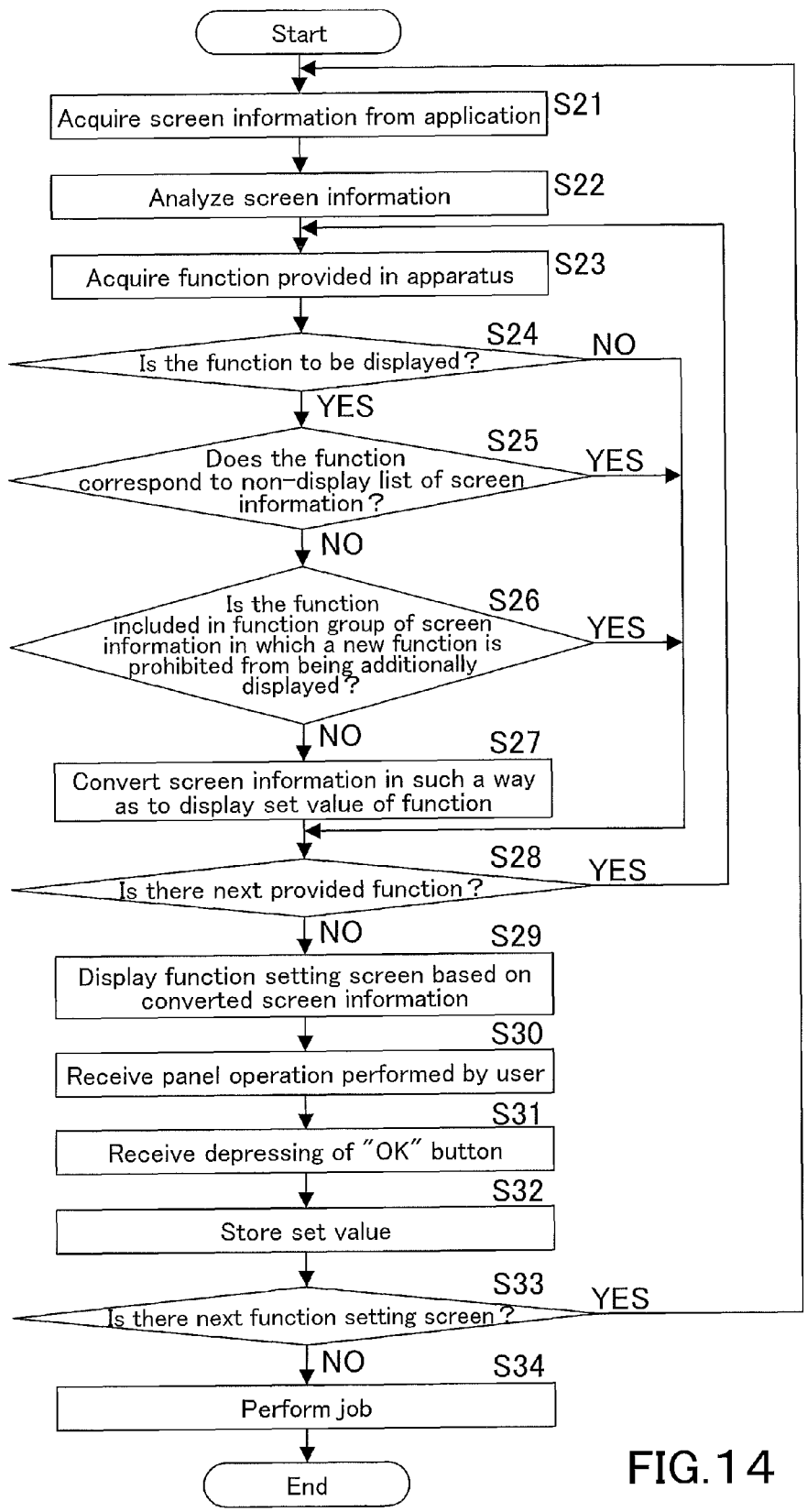
FIG. 14 is a flow chart to show a processing of controlling display of a function setting screen, the processing being performed by the image processing apparatus in the embodiment shown in FIG. 13.

FIG. 14 is a flow chart to show a processing of controlling display of a function setting screen, the processing being executed by the image processing apparatus 3 in the embodiment described in FIG. 13. This processing is performed by the CPU of the image processing apparatus 3 in accordance with an operation program recorded in a recording medium such as the ROM. Further, a processing of controlling display of a function setting screen that is performed by the image processing apparatus 2 is performed in the same way.

In step S21, screen information is acquired from the server 1 and in step S22, the screen information is analyzed.

Next, in step S23, one function provided in the image processing apparatus 3 is acquired. Specifically, one of the identifying information of the function stored in the data storage part 207 is acquired.

In step S24, it is determined whether or not the acquired function is a function to be displayed. Specifically, it is determined whether or not the acquired function is the function set by the function set value included in the screen information, or whether or not the acquired function is the function belonging to the same function group as the function set by the function set value included in the screen information.

If it is determined that the acquired function is the function set by the function set value included in the screen information or that the acquired function is the function belonging to the same function group as the function set by the function set value included in the screen information (YES in step S24), it is determined in step S25 whether or not the function corresponds to a non-display list included in the screen information 109. If it is determined that the function does not correspond to the non-display list (NO in step S25), it is determined in step S26 whether or not the function corresponds to the function group which is included in the screen information 109 and in which a new function is prohibited from being additionally displayed. If it is determined that the function does not correspond to the function group in which a new function is prohibited from being additionally displayed (NO in step S26), the screen information is converted in step S27 in such a way that all function set values related to the identified function are displayed and then the processing proceeds to step S28. If it is determined that the acquired function is not a function set by the function set value included in the screen information or that the acquired function is not a function belonging to the same function group as the function set by the function set value included in the screen information (NO in step S24), or if it is determined that the function corresponds to a non-display list included in the screen information 109 (YES in step S25), or if it is determined that the function corresponds to the function group which is included in the screen information 109 and in which a new function is prohibited from being additionally displayed (YES in step S26), the processing proceeds to step S28 without executing any steps.

In step S28, it is determined whether or not there is the next function provided in the image processing apparatus 3, and if it is determined that there is the next function provided in the image processing apparatus 3 (YES in step S28), the processing proceeds to step S23 and then steps S23 to S27 are repeated until the determination of step S28 is finished for all functions provided in the image processing apparatus 3. If the determinations of steps S24 to S26 are finished for all functions provided in the image processing apparatus 3 (NO in step S28), the processing proceeds to step S29.

In step S29, the function setting screen based on the converted screen information is displayed on the display part 210*a* of the operation panel 210.

Next, in step S30, a panel operation performed by the user, specifically, the selection of the function set value is received and in step S31, the depressing of the "OK" button is received. Then, in step S32, the function set value fixed by the depressing of the "OK" button is stored and then it is determined in step S33 whether or not there is the next function setting screen.

If it is determined that there is the next function setting screen (YES in step S33), the processing returns to step S21 in which the next screen information is acquired from the server 1. If it is determined that there is not the next function setting screen (NO in step S33), a job is performed in step S34 with the set function set value.

The present invention of the subject application having been described above may be applied to the following modes.

(1) An image processing system comprising: an information processing apparatus; and one or a plurality of image processing apparatuses that can be connected to the information processing apparatus via a network, wherein the information processing apparatus includes: an identifying information storage part for storing identifying information given in advance in such a way as to be common between the information processing apparatus and the respective image processing apparatuses in a mode in which, with respect to one or a plurality of functions provided in the image processing apparatus, a set value of the function, and a function group into which the functions are grouped, a corresponding relationship between the function group, the function, and the function set value is described; a screen information making part for making screen information which includes identifying information of at least one of the function group, the function, and the function set value and which is used for displaying a function setting screen; and a sending part for sending the screen information made by the screen information making part to the image processing apparatus in response to an acquisition request from the image processing apparatus, and wherein the image processing apparatus includes: a sending part for sending the acquisition request of the screen information to the information processing apparatus; a receiving part for receiving the screen information sent from the information processing apparatus; a display part; an identifying information storage part for storing the identifying information related to a kind of the function provided in the apparatus, a set value of the function, and the function group and, in a case where a function and/or a function set value are/is newly added, for storing also identifying information of the added function and/or the added function set value; an identifying part for identifying a function whose function set value is to be displayed on the function setting screen from among the identifying information included in the screen information received by the receiving part; and a display control part for displaying all function set values of the function identified by the identifying part of the functions whose identifying information are stored in the identifying information storage part of the apparatus on the display part in a mode that can be selected by a user.

(2) The image processing system as described in the item (1), wherein in a case where the screen information includes identifying information of at least one function set value, the identifying part identifies a function corresponding to the function set value as a function whose function set value is to be displayed on the function setting screen.

(3) The image processing system as described in the item (1), wherein in a case where the screen information includes identifying information of at least one function set value, the identifying part identifies a function corresponding to the function set value and another function belonging to the same function group as the function as a function whose function set value is to be displayed on the function setting screen.

(4) The image processing system as described in the item (1), wherein in a case where the screen information includes identifying information of at least one function, the identifying part identifies the function as a function whose function set value is to be displayed on the function setting screen.

(5) The image processing system as described in the item (1), wherein in a case where the screen information includes identifying information of at least one function, the identifying part identifies the function and another function belonging to the same function group as the function as functions whose function set values are to be displayed on the function setting screen.

(6) The image processing system as described in the item (1), wherein in a case where the screen information includes identifying information of at least one function group, the identifying part identifies a function belonging to the function group as a function whose function set value is to be displayed on the function setting screen.

(7) The image processing system as described in the item (1), wherein the identifying information has an identifying part for identifying each of a function group, a function, and a function set value, and identifying information of functions and function set values belonging to a common function group have their identifying parts of the function group constructed in a common way, and identifying information of function set values belonging to a common function have their identifying parts of the function constructed in a common way.

(8) The image processing system as described in the item (1), wherein in a case where the screen information includes identifying information of a function indicated not to be displayed on the function setting screen, the display control part does not display a function set value of the function indicated not to be displayed.

(9) The image processing system as described in the item (1), wherein in a case where the screen information includes identifying information of a function prohibited from being additionally displayed on the function setting screen, the display control part does not display a function set value of the function prohibited from being additionally displayed.

(10) The image processing system as described in the item (1), wherein a function set value whose identifying information is stored in the identifying information storage part of the image processing apparatus is displayed by a character string stored in the image processing apparatus in connection with the identifying information.

(11) An image processing apparatus that can be connected to an information processing apparatus via a network, the image processing apparatus comprising: an identifying information storage part for storing identifying information given in advance in common with the information processing apparatus in a mode in which, with respect to one or a plurality of functions provided in the image processing apparatus, a set value of the function, and a function group into which the functions are grouped, a corresponding relationship between the function group, the function, and the function set value is described, and in a case where a function and/or a function set value are/is newly added, for storing also identifying information of the added function and/or the added function set value; a sending part for sending an acquisition request of screen information, which includes identifying information of at least one of the function group, the function, and the function set value and which is used for displaying a function setting screen, to the information processing apparatus; a receiving part for receiving screen information sent from the information processing apparatus; a display part; an identifying part for identifying a function whose function set value is to be displayed on a function setting screen from among identifying information included in the screen information received by the receiving part; and a display control part for displaying all function set values related to the function identified by the identifying part of the functions whose identifying information are stored in the identifying information storage part of the apparatus on the display part in a mode that can be selected by a user.

(12) The image processing apparatus as described in the item (11), wherein in a case where the screen information includes identifying information of at least one function set value, the identifying part identifies a function corresponding to the function set value as a function whose function set value is to be displayed on the function setting screen.

(13) The image processing apparatus as described in the item (11), wherein in a case where the screen information includes identifying information of at least one function set value, the identifying part identifies a function corresponding to the function set value and another function belonging to the same function group as the function as functions whose function set values are to be displayed on the function setting screen.

(14) The image processing apparatus as described in the item (11), wherein in a case where the screen information includes identifying information of at least one function, the identifying part identifies the function as a function whose function set value is to be displayed on the function setting screen.

(15) The image processing apparatus as described in the item (11), wherein in a case where the screen information includes identifying information of at least one function, the identifying part identifies the function and another function belonging to the same function group as the function as functions whose function set values are to be displayed on the function setting screen.

(16) The image processing apparatus as described in the item (11), wherein in a case where the screen information includes identifying information of at least one function group, the identifying part identifies a function belonging to the function group as a function whose function set value is to be displayed on the function setting screen.

(17) The image processing apparatus as described in the item (11), wherein the identifying information has identifying parts for identifying each of a function group, a function, and a function set value, and identifying information of functions and function set values belonging to a common function group have their identifying parts of the function group constructed in a common way, and identifying information of function set values belonging to a common function have their identifying parts of the function constructed in a common way.

(18) The image processing apparatus as described in the item (11), wherein in a case where the screen information includes identifying information of a function indicated not to be displayed on the function setting screen, the display control part does not display a function set value related to the function indicated not to be displayed.

(19) The image processing apparatus as described in the item (11), wherein in a case where the screen information includes identifying information of a function prohibited from being additionally displayed on the function setting screen, the display control part does not display a function set value related to the function prohibited from being additionally displayed.

(20) The image processing apparatus as described in the item (11), wherein a function set value whose identifying information is stored in the identifying information storage part of the image processing apparatus is displayed by a character string stored in the image processing apparatus in connection with the identifying information.

(21) A method for controlling display of a function setting screen, the method being performed in an image processing system including an information processing apparatus and one or a plurality of image processing apparatuses that can be connected to the information processing apparatus via a network, wherein the information processing apparatus includes an identifying information storage part for storing identifying information given in advance in such a way as to be common between the information processing apparatus and the respective image processing apparatuses in a mode in which with respect to a function provided in the image processing apparatus, a set value of the function, and a function group into which the functions are grouped, a corresponding relationship between the function group, the function, and the function set value is described, and performs: making screen information which includes identifying information of at least one of the function group, the function, and the function set value and which is used for displaying a function setting screen, and sending the screen information made in the step of making screen information to the image processing apparatus in response to an acquisition request from the image processing apparatus, and wherein the image processing apparatus includes an identifying information storage part for storing the identifying information of a kind of the function provided in the apparatus, a set value of the function, and the function group and, in a case where a function and/or a function set value are/is newly added, for also storing identifying information related to the added function and/or the added function set value, and performs: sending an acquisition request of the screen information to the information processing apparatus; receiving screen information sent from the information processing apparatus; identifying a function whose function set value is to be displayed on the function setting screen from among identifying information included in the screen information received in the step of receiving; and displaying all function set values related to the function identified in the step of identifying of the functions whose identifying information are stored in the identifying information storage part of the apparatus on the display part in a mode which can be selected by a user.

(22) A non-transitory computer-readable recording medium having a program for controlling display of a function setting screen stored thereon to make a computer of an image processing apparatus, which can be connected to an information processing apparatus via a network, the information processing apparatus including an identifying information storage part for storing identifying information given in advance in common with each of the image processing apparatuses in a mode in which, with respect to one or a plurality of functions provided in each of the image processing apparatuses, a set value of the function, and a function group into which the functions are grouped, a corresponding relationship between the function group, the function, and the function set value is described, the image processing apparatus including an identifying information storage part for storing the identifying information related to a kind of the function provided in the apparatus, a set value of the function, and the function group and, in a case where a function and/or a function set value are/is newly added, for also storing the identifying information related to the added function and/or the added function set value, wherein the program makes the computer execute: sending an acquisition request of the screen information, which includes identifying information of at least one of the function group, the function, and the function set value and is used for displaying the function setting screen, to the information processing apparatus; receiving screen information sent from the information processing apparatus; identifying a function whose function set value is to be displayed on the function setting screen from among identifying information included in the screen information received in the step of receiving; and displaying all function set values related to the function identified in the step of identifying of the functions whose identifying information are stored in the identifying information storage part of the apparatus on a display part in a mode that can be selected by a user.

(23) The recording medium as described in the item (22), wherein in a case where the screen information includes identifying information of at least one function set value, the program makes the computer further execute identifying a function corresponding to the function set value as a function whose function set value is to be displayed on the function setting screen.

(24) The recording medium as described in the item (22), wherein in a case where the screen information includes identifying information of at least one function set value, the program makes the computer further execute identifying a function corresponding to the function set value and another function belonging to the same function group as the function as functions whose function set values are to be displayed on the function setting screen.

(25) The recording medium as described in the item (22), wherein in a case where the screen information includes identifying information of at least one function, the program makes the computer further execute identifying the function as a function whose function set value is to be displayed on the function setting screen.

(26) The recording medium as described in the item (22), wherein in a case where the screen information includes identifying information of at least one function, the program makes the computer further execute identifying the function and another function belonging to the same function group as the function as functions whose function set values are to be displayed on the function setting screen.

(27) The recording medium as described in the item (22), wherein in a case where the screen information includes identifying information of at least one function group, the program makes the computer further execute identifying a function belonging to the function group as a function whose function set value is to be displayed on the function setting screen.

(28) The recording medium as described in the item (22), wherein the identifying information has identifying parts for identifying each of a function group, a function, and a function set value, and identifying information of functions and function set values belonging to a common function group have their identifying parts of the function group constructed in a common way, and identifying information of function set values belonging to a common function have their identifying parts of the function constructed in a common way.

(29) The recording medium as described in the item (22), wherein in a case where the screen information includes identifying information of a function indicated not to be displayed on the function setting screen, the program makes the computer execute not displaying a function set value related to the function indicated not to be displayed.

(30) The recording medium as described in the item (22), wherein in a case where the screen information includes identifying information of a function prohibited from being additionally displayed on the function setting screen, the program makes the computer execute not displaying a function set value related to the function prohibited from being additionally displayed.

(31) The recording medium as described in the item (22), wherein a function set value whose identifying information is stored in the identifying information storage part of the image processing apparatus is displayed by a character string stored in the image processing apparatus in connection with the identifying information.

According to the invention described in the item (1), a function whose function set value is to be displayed on a function setting screen is identified from among the identifying information included in the screen information made by the information processing apparatus, and of the functions whose identifying information is stored in the identifying information storage part of the image processing apparatus, all function set values related to the identified function are displayed on the display part in a mode that can be selected by a user. That is, in a case where a new function is provided in the image processing apparatus or a new function set value is added to an existing function, the newly provided function and the existing function to which a new function set value is added are identified as functions whose function set values are to be displayed on the function setting screen, so that the function set values related to these functions can be additionally displayed on the function setting screen. Hence, even if an application for forming a function setting screen of the information processing apparatus is not updated, the user can select the function set value additionally displayed to set the function.

According to the invention described in the item (2), in a case where the screen information includes the identifying information of at least one function set value, a function corresponding to the function set value can be identified as a function whose function set value is to be displayed on the function setting screen.

According to the invention described in the item (3), in a case where the screen information includes the identifying information of at least one function set value, the identifying part can identify a function corresponding to the function set value and another function belonging to the same function group as the function as functions whose function set values are to be displayed on the function setting screen.

According to the invention described in the item (4), in a case where the screen information includes the identifying information of at least one function, the function can be identified as a function whose function set value is to be displayed on the function setting screen.

According to the invention described in the item (5), in a case where the screen information includes identifying information of at least one function, the function and another function belonging to the same function group as the function can be identified as functions whose function set values are to be displayed on the function setting screen.

According to the invention described in the item (6), in a case where the screen information includes the identifying information of at least one function group, a function belonging to the function group can be identified as a function whose function set value is to be displayed on the function setting screen.

According to the invention described in the item (7), the identifying information has an identifying part for identifying each of a function group, a function, and a function set value, and the identifying information of functions and function set values belonging to a common function group have their identifying parts of the function group constructed in a common way, and the identifying information of function set values belonging to a common function have their identifying parts of the function constructed in a common way. Thus, a corresponding relationship between the function group, the function, and the function set value can be easily recognized.

According to the invention described in the item (8), when the screen information is made to include the identifying information of a function indicated not to be displayed on the function setting screen, it is possible not to display a function set value related to the function indicated not to be displayed.

According to the invention described in the item (9), when the screen information is made to include the identifying information of a function prohibited from being additionally displayed on the function setting screen, it is possible not to display a function set value related to the function prohibited from being additionally displayed.

According to the invention described in the item (10), a function set value whose identifying information is stored in the identifying information storage part of the image processing apparatus can be displayed by a character string stored in the image processing apparatus in connection with the identifying information.

According to the invention described in the item (11), in a case where a new function is provided in the image processing apparatus and in a case where a new function set value is added to the image processing apparatus, even if the application is not updated, a function set value related to the new function and the added function set value can be displayed on the function setting screen of the image processing apparatus.

According to the invention described in the item (12), in a case where the screen information includes the identifying information of at least one function set value, a function corresponding to the function set value can be identified as a function whose function set value is to be displayed on the function setting screen.

According to the invention described in the item (13), in a case where the screen information includes the identifying information of at least one function set value, the identifying part can identify a function corresponding to the function set value and another function belonging to the same function group as the functions as functions whose function set values are to be displayed on the function setting screen.

According to the invention described in the item (14), in a case where the screen information includes the identifying information of at least one function, the function can be identified as a function whose function set value is to be displayed on the function setting screen.

According to the invention described in the item (15), in a case where the screen information includes the identifying information of at least one function, the function and another function belonging to the same function group as the function can be identified as functions whose function set values are to be displayed on the function setting screen.

According to the invention described in the item (16), in a case where the screen information includes the identifying information of at least one function group, a function belonging to the function group can be identified as a function whose function set value is to be displayed on the function setting screen.

According to the invention described in the item (17), the identifying information has identifying parts for identifying each of a function group, a function, and a function set value, and the identifying information of functions and function set values belonging to a common function group have their identifying parts of the function group constructed in a common way, and the identifying information of function set values belonging to a common function have their identifying parts of the function constructed in a common way. Hence, a corresponding relationship between the function group, the function, and the function set value can be easily recognized.

According to the invention described in the item (18), when the screen information is made to include the identifying information of a function indicated not to be displayed on the function setting screen, it is possible not to display a function set value related to the function indicated not to be displayed.

According to the invention described in the item (19), when the screen information is made to include the identifying information of a function prohibited from being additionally displayed on the function setting screen, it is possible not to display a function set value related to the function prohibited from being additionally displayed.

According to the invention described in the item (20), a function set value whose identifying information is stored in the identifying information storage part of the image processing apparatus can be displayed by a character string stored in the image processing apparatus in connection with the identifying information.

According to the invention described in the item (21), in a case where a new function is provided in the image processing apparatus and in a case where a new function set value is added to the image processing apparatus, even if the application is not updated, it is possible to make a computer of the image processing apparatus perform a processing of displaying a function set value related to the new function and the added function set value on the function setting screen of the display part in a mode that can be selected by the user.

According to the invention described in the item (22), in a case where a new function is provided in the image processing apparatus and in a case where a new function set value is added to the image processing apparatus, even if the application is not updated, a function set value related to the new function and the added function set value can be displayed on the function setting screen of the display part in a mode that can be selected by the user.

According to the invention described in the item (23), in a case where the screen information includes the identifying information of at least one function set value, it is possible to make a computer perform a processing of identifying a function corresponding to the function set value as a function whose function set value is to be displayed on the function setting screen.

According to the invention described in the item (24), in a case where the screen information includes the identifying information of at least one function set value, the identifying part can make a computer perform a processing of identifying a function corresponding to the function set value and another function belonging to the same function group as the function as functions whose function set values are to be displayed on the function setting screen.

According to the invention described in the item (25), in a case where the screen information includes the identifying information of at least one function, it is possible to make a computer perform a processing of identifying the function as a function whose function set value is to be displayed on the function setting screen.

According to the invention described in the item (26), in a case where the screen information includes the identifying information of at least one function, it is possible to make a computer perform a processing of identifying the function and another function belonging to the same function group as the function as functions whose function set values are to be displayed on the function setting screen.

According to the invention described in the item (27), in a case where the screen information includes the identifying information of at least one function group, it is possible to make a computer perform a processing of identifying a function belonging to the function group as a function whose function set value is to be displayed on the function setting screen.

According to the invention described in the item (28), the identifying information has identifying parts for identifying each of a function group, a function, and a function set value, and the identifying information of functions and function set values belonging to a common function group have their identifying parts of the function group constructed in a common way, and the identifying information of function set values belonging to a common function have their identifying parts of the function constructed in a common way. Thus, a computer can easily recognize a corresponding relationship between the function group, the function, and the function set value.

According to the invention described in the item (29), when the screen information is made to include the identifying information of a function indicated not to be displayed on the function setting screen, it is possible to make a computer perform a processing of prohibiting display of a function set value related to the function indicated not to be displayed.

According to the invention described in the item (30), when the screen information is made to include the identifying information of a function prohibited from being additionally displayed on the function setting screen, it is possible to make a computer perform a processing of prohibiting display of a function set value related to the function prohibited from being additionally displayed.

According to the invention described in the item (31), it is possible to make a computer perform a processing of displaying a function set value whose identifying information is stored in the identifying information storage part of the image processing apparatus by a character string stored in the image processing apparatus in connection with the identifying information.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing system comprising: an information processing apparatus; and
one or more image processing apparatuses capable of being connected to the information processing apparatus via a network,
the information processing apparatus comprising:
an identification information memory which has the following objects recorded in advance:
one or more functions installed on the one or more image processing apparatuses;
one or more possible values to be set for the one or more functions; and
one or more function groups to which the one or more functions belong, as identification information being common to and shared by the information processing apparatus itself and the one or more image processing apparatuses, along with the connections between the above-introduced objects;
a screen information generator which generates screen information of a function setting screen, the screen information including at least one of the above-introduced objects; and
a transmitter which transmits the screen information generated by the screen information generator, to the one or more image processing apparatuses in response to a request from the one or more image processing apparatuses, the one or more image processing apparatuses each comprising:
a transmitter which transmits a request for the screen information to the information processing apparatus;
a receiver which receives the screen information from the information processing apparatus;
a display;
an identification information memory which:
has the above-introduced objects recorded in advance as the identification information along with the connections between the above-introduced objects; and
further records either or both of a new function and a possible value to be set for the new function, as the identification information, if the new function is additionally installed on the image processing apparatus;
an identification portion which identifies a function matching the at least one of the above-introduced objects included in the screen information, as a target function, all possible values for which should be displayed on the function setting screen; and
a display controller which displays on the function setting screen, all possible values to be set for the identified function in a form which allows users to select among them.

2. The image processing system as claimed in claim 1, wherein if at least one possible value is included in the screen information, a function matching the at least one possible value is identified as the target function.

3. The image processing system as claimed in claim 1, wherein if at least one possible value is included in the screen information, a function matching the at least one possible value and another or more functions belonging to the same function group as the matching function are identified as the target functions.

4. The image processing system as claimed in claim 1, wherein if at least one function is included in the screen information, the at least one function is identified as the target function.

5. The image processing system as claimed in claim 1, wherein if at least one function is included in the screen information, the at least one function and another one or more functions belonging to the same function group as the at least one function are identified as the target functions.

6. The image processing system as claimed in claim 1, wherein if at least one function group is included in the screen information, one or more functions belonging to the at least one function group are identified as the target functions.

7. The image processing system as claimed in claim 1, wherein:
the above-introduced objects recorded as the identification information on the memory of the information processing apparatus are connected to each other; and
one or more functions belonging to each of the one or more function groups and one or more possible values to be set for the one or more functions are connected to each other by the same function group, and one or more possible values to be set for each of the one or more functions are connected to each other by the same function.

8. The image processing system as claimed in claim 1, wherein if a function configured to be hidden from the function setting screen is included in the screen information, one or more possible values to be set for the function is not displayed on the function setting screen.

9. The image processing system as claimed in claim 1, wherein if a function prohibited from being additionally displayed on the function setting screen is included in the screen information, one or more possible values to be set for the function is not displayed on the function setting screen.

10. The image processing system as claimed in claim 1, wherein one or more strings recorded on the image processing apparatus along with the connections between the above-introduced objects are displayed on the function setting screen as the one or more possible values to be set for the one or more functions installed thereon.

11. An image processing apparatus capable of being connected to an information processing apparatus via a network, the image processing apparatus comprising:
an identification information memory which:
has the following objects recorded in advance:
one or more functions installed on the image processing apparatus;
one or more possible values to be set for the one or more functions; and
one or more function groups to which the one or more functions belong, as identification information being common to and shared by the image processing apparatus itself and the information processing apparatus, along with the connections between the above-introduced objects; and
further records either or both of a new function and a possible value to be set for the new function, as the identification information, if the new function is additionally installed on the image processing apparatus;
a transmitter which transmits a request for screen information of a function setting screen to the information processing apparatus, the screen information including at least one of the above-introduced objects;
a receiver which receives the screen information from the information processing apparatus;
a display;
an identification portion which identifies a function matching the at least one of the above-introduced objects included in the screen information, as a target function, all possible values for which should be displayed on the function setting screen; and
a display controller which displays on the function setting screen, all possible values to be set for the identified function in a form which allows users to select among them.

12. The image processing apparatus as claimed in claim 11, wherein if at least one possible value is included in the screen information, a function matching the at least one possible value is identified as the target function.

13. The image processing apparatus as claimed in claim 11, wherein if at least one possible value is included in the screen information, a function matching the at least one possible value and another or more functions belonging to the same function group as the matching function are identified as the target functions.

14. The image processing apparatus as claimed in claim 11, wherein if at least one function is included in the screen information, the at least one function is identified as the target function.

15. The image processing apparatus as claimed in claim 11, wherein if at least one function is included in the screen information, the at least one function and another one or more functions belonging to the same function group as the at least one function are identified as the target functions.

16. The image processing apparatus as claimed in claim 11, wherein if at least one function group is included in the screen information, one or more functions belonging to the at least one function group are identified as the target functions.

17. The image processing apparatus as claimed in claim 11, wherein:
the above-introduced objects recorded as the identification information on the memory of the information processing apparatus are connected to each other; and
one or more functions belonging to each of the one or more function groups and one or more possible values to be set for the one or more functions are connected to each other by the same function group, and one or more possible values to be set for each of the one or more functions are connected to each other by the same function.

18. The image processing apparatus as claimed in claim 11, wherein if a function configured to be hidden from the function setting screen is included in the screen information, one or more possible values to be set for the function is not displayed on the function setting screen.

19. The image processing apparatus as claimed in claim 11, wherein if a function prohibited from being additionally displayed on the function setting screen is included in the screen information, one or more possible values to be set for the function is not displayed on the function setting screen.

20. The image processing apparatus as claimed in claim 11, wherein one or more strings recorded on the image processing apparatus along with the connections between the above-introduced objects are displayed on the function setting screen as the one or more possible values to be set for the one or more functions installed thereon.

21. A method of controlling display of a function setting screen, the method being implemented by an image processing system comprising: an information processing apparatus; and one or more image processing apparatuses capable of being connected to the information processing apparatus via a network, the information processing apparatus comprising an identification information memory which has the following objects recorded in advance:

one or more functions installed on the one or more image processing apparatuses;

one or more possible values to be set for the one or more functions; and one or more function groups to which the one or more functions belong, as identification information being common to and shared by the information processing apparatus itself and the one or more image processing apparatuses, along with the connections between the above-introduced objects, the method comprising:

generating screen information of a function setting screen, the screen information including at least one of the above-introduced objects; and transmitting the generated screen information to the one or more image processing apparatuses in response to a request from the one or more image processing apparatuses, the one or more image processing apparatuses each comprising an identification information memory which:

has the above-introduced objects recorded in advance as the identification information along with the connections between the above-introduced objects; and further records either or both of a new function and a possible value to be set for the new function, as the identification information, if the new function is additionally installed on the image processing apparatus, the method further comprising:

transmitting a request for the screen information to the information processing apparatus;

receiving the screen information from the information processing apparatus;

identifying a function matching the at least one of the above-introduced objects included in the screen information, as a target function, all possible values for which should be displayed on the function setting screen; and displaying on the function setting screen, all possible values to be set for the identified function in a form which allows users to select among them.

22. A non-transitory computer-readable recording medium having a program to control display of a function setting screen, the program to be executed by one or more computers of one or more image processing apparatuses capable of being connected to an information processing apparatus via a network, the information processing apparatus comprising an identification information memory which has the following objects recorded in advance:

one or more functions installed on the one or more image processing apparatuses;

one or more possible values to be set for the one or more functions; and one or more function groups to which the one or more functions belong, as identification information being common to and shared by the information processing apparatus itself and the one or more image processing apparatuses, along with the connections between the above-introduced objects, the one or more image processing apparatuses each comprising an identification information memory which:

has the above-introduced objects recorded in advance as the identification information along with the connections between the above-introduced objects; and further records either or both of a new function and a possible value to be set for the new function, as the identification information, if the new function is additionally installed on the image processing apparatus, the program to make the one or more computers execute:

transmitting a request for screen information of a function setting screen to the information processing apparatus, the screen information including at least one of the above-introduced objects;

receiving the screen information from the information processing apparatus;

identifying a function matching the at least one of the above-introduced objects included in the screen information, as a target function, all possible values for which should be displayed on the function setting screen; and displaying on the function setting screen, all possible values to be set for the identified function in a form which allows users to select among them.

23. The non-transitory computer-readable recording medium having the program according to claim 22, wherein if at least one possible value is included in the screen information, a function matching the at least one possible value is identified as the target function.

24. The non-transitory computer-readable recording medium having the program according to claim 22, wherein if at least one possible value is included in the screen information, a function matching the at least one possible value and another or more functions belonging to the same function group as the matching function are identified as the target functions.

25. The non-transitory computer-readable recording medium having the program according to claim 22, wherein if at least one function is included in the screen information, the at least one function is identified as the target function.

26. The non-transitory computer-readable recording medium having the program according to claim 22, wherein if at least one function is included in the screen information, the at least one function and another one or more functions belonging to the same function group as the at least one function are identified as the target functions.

27. The non-transitory computer-readable recording medium having the program according to claim 22, wherein if at least one function group is included in the screen information, one or more functions belonging to the at least one function group are identified as the target functions.

28. The non-transitory computer-readable recording medium having the program according to claim 22, wherein:

the above-introduced objects recorded as the identification information on the memory of the information processing apparatus are connected to each other; and one or more functions belonging to each of the one or more function groups and one or more possible values to be set for the one or more functions are connected to each other by the same function group, and one or more possible values to be set for each of the one or more functions are connected to each other by the same function.

29. The non-transitory computer-readable recording medium having the program according to claim 22, wherein if a function configured to be hidden from the function setting screen is included in the screen information, one or more possible values to be set for the function is not displayed on the function setting screen.

30. The non-transitory computer-readable recording medium having the program according to claim 22, wherein if a function prohibited from being additionally displayed on the function setting screen is included in the screen information, one or more possible values to be set for the function is not displayed on the function setting screen.

31. The non-transitory computer-readable recording medium having the program according to claim 22, wherein one or more strings recorded on the one or more image processing apparatuses along with the connections between the above-introduced objects are displayed on the function setting screen as the one or more possible values to be set for the one or more functions installed thereon.

* * * * *